United States Patent [19]

Thomas

[11] Patent Number: 5,838,970
[45] Date of Patent: Nov. 17, 1998

[54] OBJECT-ORIENTED COMPUTER ENVIRONMENT AND RELATED METHOD

[75] Inventor: Tony Clifton Thomas, Flower Mound, Tex.

[73] Assignee: Recognition International Inc., Irving, Tex.

[21] Appl. No.: 911,428

[22] Filed: Aug. 14, 1997

Related U.S. Application Data

[63] Continuation of Ser. No. 317,734, Oct. 4, 1994, abandoned.

[51] Int. Cl.$^6$ .................................................... G06F 9/40
[52] U.S. Cl. ............................................................ 395/683
[58] Field of Search ................................... 395/680, 683; 707/103

[56] References Cited

U.S. PATENT DOCUMENTS

| | | | |
|---|---|---|---|
| 5,396,630 | 3/1995 | Banda et al. | 395/683 |
| 5,457,797 | 10/1995 | Butterworth et al. | 395/682 |
| 5,539,909 | 7/1996 | Tanaka et al. | 395/683 |
| 5,546,584 | 8/1996 | Lundin et al. | 395/683 |
| 5,560,005 | 9/1996 | Hoover et al. | 707/10 |
| 5,613,148 | 3/1997 | Bezviner et al. | 395/200.33 |

OTHER PUBLICATIONS

Zondag, E.G., "Hierarchical Management of Distributed Objects", University of Twente, Department of Computer Science, the Netherlands, pp. 1–21, Nov. 1990.
(No author) The Common Object Request Broker Architecture and Specification, OMG Document No. 91.12.1, Revision 1.1, pp. 1–177, 1992.
Alfred C., "Maximizing leverage from an object database", IBM Systems Journa, vol. 33, No. 2, pp. (1–24), 1994.
(no author given) "Objectively Speaking", EXE, v8, n9, p.40(2), Mar. 1994.
(no author given) "Management Integration Consortium to publish draft network management repository specifications by August", Computergram International, CGI06060010, Jun. 1994.
Corrigan, Jim, Eric Olinger, "Consortium pushes to bring intergration, simplicity to users", Network World, p. 40, May 1994.
Eckerson, Wayne (Editor), "Three technologies form the basis for emerging middleware, and each offers a new wrinkle for networking applications", Network World, p. 43, Jun. 1993.
Orfali, Robert and Dan Harkey, "Client/Server Survival guide with OS/2®", Van Nostrand Reinhold, pp. 732–735, 800–812, Mar. 1994.
Manual of HyperDesk Corp. entitled: "The HyperDesk Distributed Object Managment System", pp. Apps iii–x, Apps 1–1 to 1–25, Apps 4–1 to 4–10, Apps 5–1 to 9, Apps 6–1 to 6–4, Apps 7–1 to 7–6, Objects iii–ix, Objects 1–1 to 1–8, Objects 2–1 to 2–14, Methods 1–1 to 1–15, Clt/C1–1 to C1–6 (1994).
Object Management Group, *The Common Object Request Broker: Architecture and Specification*, OMG Document No. 91.12.1, revision 1.1, pp. 27–44, 161–163 (1991).
Brooch, Grady, *Object–Oriented Design with Applications*, Benjamin/Cummings Publishing Co., Inc., pp. 70–71 (1991).
Ofali, Robert and Dan Harkey, "Client/Server Programming with CORBA Objects", OS/2 Developer, vol. 5, No. 5, Sep./Oct. 1994, pp. 46–53.

(List continued on next page.)

*Primary Examiner*—Majid A. Banankhan
*Assistant Examiner*—St. John Courtenay, III
*Attorney, Agent, or Firm*—Darby & Darby, P.C.

[57] ABSTRACT

An object-oriented computer environment is managed by storing, in a plurality of repositories accessible during the life cycles of objects, information required to initiate object operations. The repositories can contain location information identifying the storage location of system objects or information indicating preferences for a preselected manner of performing object operations. In another preferred form, the repositories can be assigned to different levels of a hierarchy to control the distribution of stored information.

48 Claims, 22 Drawing Sheets

OTHER PUBLICATIONS

Hong, Zhao and Wayne McCoy, "An Associated Object Model for Distributed Systems", Operating Systems Review (SIGOPS), vol. 24, No. 4, Oct. 1990, pp. 34–51.

Schill, Alexander and Gerold Blakowski, "Configuration Management for Distributed Object–Oriented Applications", SBI/IEEE International Communications Symposium, Sep. 3–6, 1990, Rio De Janerio, Brazil, pp. 577–581.

"Topology Database of Managed Objects", IBM Technical Disclosure Bulletin, vol. 37, No. 7, Jul. 1994, pp. 435–436.

OBJECT-ORIENTED COMPUTER ENVIRONMENT AND RELATED METHOD

This is a continuation application of application Ser. No. 08/317,734, filed Oct. 4, 1994

BACKGROUND OF THE INVENTION

The present invention relates to computer and communications systems and, more particularly, to an object-oriented computer environment (for example, a comprehensive composite of communication and computing facilities) and method for managing the environment.

Recent advances in computer technology have brought about the proliferation of relatively low cost, yet extremely powerful computers. Despite the reduced cost of these computers, it is still impractical in many situations to install all of the information, computer software, computer processing power and other computing resources that a given user or group of users may need on a single computer. Thus, in many computing environments, the computing resources available to users are distributed among several machines. As the number of machines in a distributed environment grows, the problems associated with sharing resources grow as well.

A variety of networking solutions have been proposed to facilitate the sharing of resources among different computers. However, due to the large number of different microprocessors, operating systems and other computer components that may be used on a given computer in a distributed computing environment, managing resources in such an environment can be quite difficult.

In addition, as the number and variety of computers in a distributed environment increase, the administration of the environment becomes more difficult since more computers and more configurations must be maintained. Furthermore, since computers are often assigned to individual users in a distributed environment, the task of administering a computer may fall upon the user. This is troublesome because users often are neither capable of nor interested in administration tasks.

Finally, as specific computing resources become increasingly popular in a distributed computing environment, the demand for such resources increases. In the past, popular resources have often been duplicated to make them more widely available. However, as a distributed computing environment increases in size, the complexity of the network connecting the computers increases, as well. This, in turn, makes it more difficult to duplicate resources without undesirably complicating and slowing computer operations.

One method for reducing the administrative burden associated with complex computer systems, such as a distributed computing environment, involves the use object-oriented programming. In object-oriented programming, an object is defined as a combination of data and operations to be performed on that data. Such objects are invoked, as needed, to perform a given task. For example, if a user wants to draw an icon on a screen, the user invokes an object capable of drawing the icon. object-oriented programming has the advantage that a routine calling the object ("calling function") does not need to "know" how the object performs its operations. The object is defined solely by its interface, which consists of a set of named operations along with any parameters required to perform those operations. Thus, the calling function "knows" only the operation performed by the object and how to invoke it.

An object can be changed at any time to perform its function differently and the change is transparent to the calling function so long as the interface to the object remains unchanged. Thus, an object-oriented system can be upgraded or maintained with minimal changes to applications already present in the system. Programming code in an object-oriented system is therefore more modular and maintainable than that written using more traditional programming techniques. As a result, object-oriented programming reduces the overhead associated with changing program code or installing new code to perform old functions.

An industry consortium called the Object Management Group ("OMG") has developed a standard for object-oriented systems known as the Common Object Request Broker Architecture ("CORBA"). The CORBA standard calls for three basic system elements, that is, an object broker, an implementation repository and an interface repository. The object broker of CORBA provides a mechanism by which objects or other applications can make requests to and receive responses from other objects managed by the system. The interface repository is used by the object broker to determine which objects are being invoked by an object operation request and to create an interface to new objects as they are created. The implementation repository holds information that allows the object broker to access the actual executable code required to perform the object operations.

As currently employed, the object broker handles object requests from "client applications", which can be programs implemented by a user or machine-based requests stemming from operational events such as function calls. Here, a client application passes to the object broker an object reference identifying the desired object operation along with any required parameters. After receiving an object operation request from the client application, the object broker uses the object reference to retrieve the location of the executables from the implementation repository. The object broker then activates the executables, which causes the desired operation to be performed. Thereafter, the implementation passes any results back to the object broker, which passes them, in turn, to the client application. This completes the object operation sequence.

The CORBA approach makes use of multiple object brokers, with the various components of the system distributed, as needed, to accommodate growth or the reassignment of system resources. Each of these multiple object brokers is capable of accessing information in corresponding implementation and interface repositories. Object requests are transparent to the users in that an object operation can be performed on an array of several computing devices and the entity invoking the object operation need not be aware of where the object operation resides or is executed. Consequently, using the CORBA approach the individual user is freed from the responsibility of administrating where specific programs reside or where they are executed since these details are handled by the administrators of the CORBA-based system. In addition, by defining a fixed set of operations, the CORBA approach enables object brokers from different vendors to communicate with each other, causing the system to be more universally compatible.

Since the information on how to interface to an object and execute the object are contained in the interface and implementation repositories, respectively, new objects can be added to a CORBA-based system simply by updating the information in the respective repositories. Consequently, such a system can be upgraded easily to accommodate new or modified objects.

Because the object-oriented approach allows the actual implementation of an object's operations to be transparent to the user, existing applications need only be modified in their interface in order to function in a CORBA based system. Consequently, existing applications need not be completely rewritten in order to work with the system.

In spite of these advantages, however, CORBA does not address problems in a number of areas. First, CORBA does not provide a mechanism for moving objects after an object is created. Second, CORBA does not make an individual user's information accessible throughout the network or permit the system resources to be administered at either the user level or the object level. In addition, CORBA does not support the use of multiple versions of a given object type. CORBA also does not provide for an effective means of duplicating highly used resources.

Accordingly, it is desirable in many applications to provide an improved object-oriented computer environment permitting greater flexibility and adaptability in its operation and reducing the burden of system administration.

SUMMARY OF THE INVENTION

The present invention relates to an object-oriented computer environment managed by storing information required to perform object operations in a plurality of changeable repositories accessible to object brokers. The stored information can relate, for example, to preferences of users for the manner in which object operations are performed or to default preferences of users in a specific group or geographic area. The information is retrieved on a selective basis when object operations are requested, permitting objects to be customized to the needs of a user or a group of users during an object activation sequence.

In one embodiment, information identifying the storage location of an object is kept in a location repository reserved for that purpose and updated periodically. This is a form of "indirect addressing" which enables an object to be moved, or one object to be substituted for another, without altering the location reference utilized by client application programs that activate the object. Only the contents of the location repository itself need be changed. The objects invoked in any given situation therefore can be changed without affecting the object's client application.

Administration of the object-oriented environment is further simplified in another embodiment of the invention by organizing repository information in hierarchies and selectively replicating information within the hierarchies. The hierarchial arrangement facilitates growth by allowing information to be distributed throughout a system to any extent required. Information frequently used in one part of the hierarchy but not in another can be installed only in those parts where it is actually used, drastically reducing information storage. Furthermore, since the depth and width of any hierarchy can be increased as the system of the disclosed embodiment grows, the system reduces "bottlenecking" that often occurs when users access information from a common source.

In one embodiment, the invention provides a mechanism for each level of a hierarchy to access other levels. This is done by storing at each level the information needed to access repositories at that particular level, at higher levels or at lower levels of the repository.

Although the system of the invention is useful in a wide variety of circumstances to distribute and process information, it is particularly suited to the needs of "distributed computing systems" where system resources, such as networks, computing resources, computing applications and transmission facilities, are distributed over a geographical area or divided among several entities. A system constructed according to the invention can easily accommodate widespread growth and reallocation of resources from one location or entity to another.

The primary components of the disclosed system are: (1) objects written to perform specific tasks; (2) object brokers capable of handling requests to have object operations performed; and (3) changeable repositories containing information required to perform object operations and administer the larger system. The system performs an object operation when a client application (such as a user at a computer terminal, another object operation or a system administrator) sends a request to perform the operation to the object broker. The object broker then uses information retrieved from the repositories to activate the object and alter the manner in which the object operation is performed. After the operation is complete, any results may be sent back through the object broker to the client application that requested the operation.

By using information retrieved from changeable repositories to affect object operations, the invention permits a computer-based information processing and distribution system to expand, as needed, with relative ease and minimal administrative overhead. It also permits the components of the system to be distributed over as wide an area and among as many segments of the system as required. In addition, it enables the performance of object operations to be customized on the basis of user preferences, group preferences, default preferences or preferences based on the hardware and software on which an object is to run.

When repositories are accessible on a system-wide basis, all upgrades can be performed by a system administrator rather than a local user, significantly reducing the user's administrative workload. For example, the present development allows software upgrades to be made by an administrator merely changing the contents of appropriate information repositories. Thus, software can be upgraded or new software can be installed with minimal effort by the user.

Moreover, since the present invention can work within a distributed network, a user can utilize his or her personal computer or take advantage of resources available elsewhere in the network. Because the user's personal preferences and home operating environment are stored in information repositories, the user can access his or her home environment at any computer throughout the system.

In sum, the present invention provides a computer system or environment wherein the manner of processing or transmitting information can be altered in the course of object operations, and where the resources required to perform object operations can be distributed throughout the system, as needed. Furthermore, the invention provides this flexibility while simplifying administration of the system.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF THE PREFERRED EMBODIMENTS

For purposes of illustration and explanation, the object-oriented environment 20 of the present invention is discussed in terms of a CORBA-based system. The CORBA standard is described in a document entitled *The Common Object Request Broker: Architecture and Specification*, published in 1992 by the Object Management Group, Inc. and X/Open Company Limited, the teachings of which are hereby incorporate d by reference for all purposes. It will be understood, however, that the features of the invention may be applicable broadly to any object-oriented system or network, regardless of how it is implemented.

Figure 1:
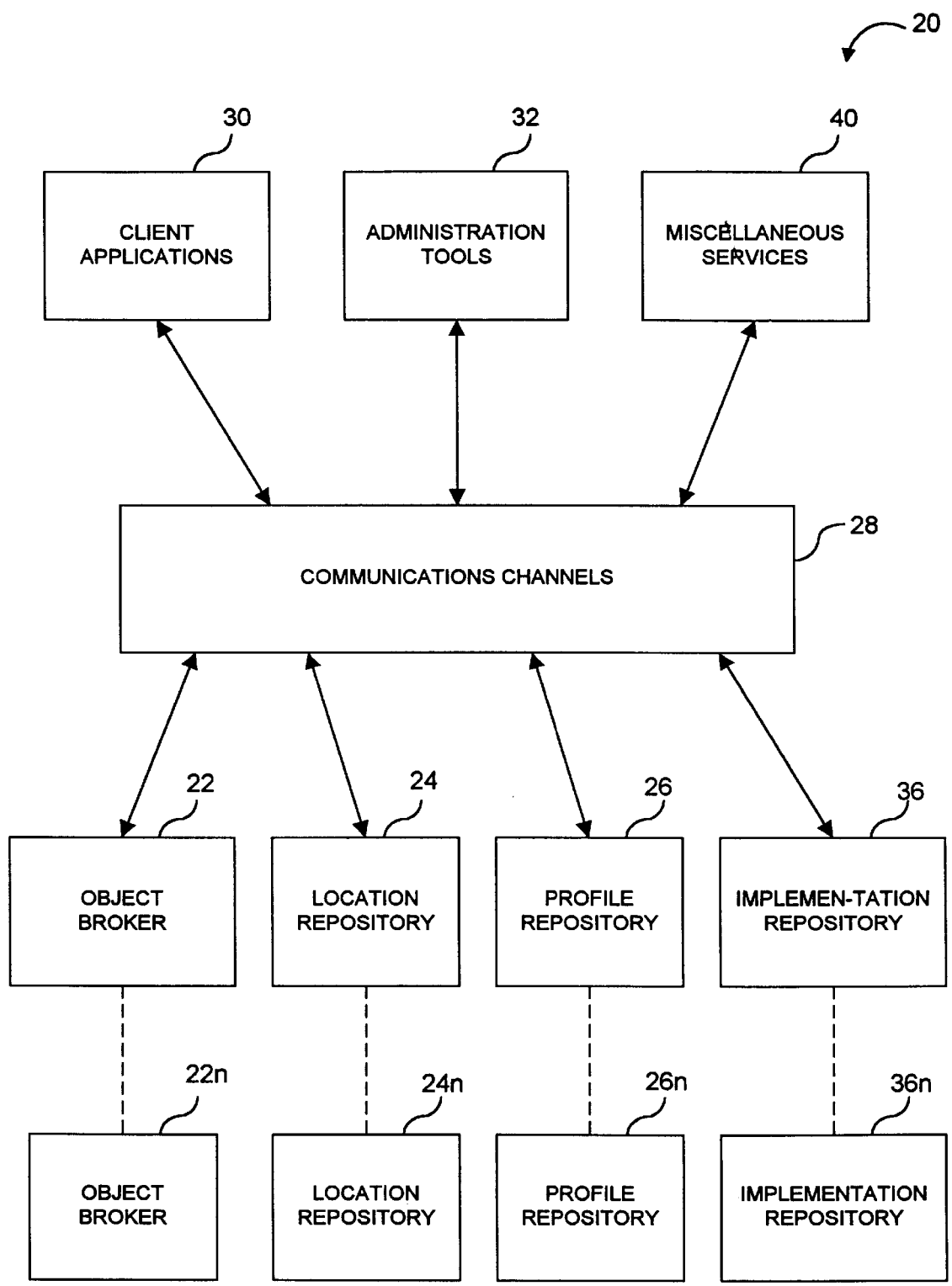
FIG. 1 is a high-level system block diagram of an object-oriented computer environment constructed according to one embodiment of the present invention.

Referring now to the drawings, specifically FIG. 1, an object-oriented environment 20 constructed according to one embodiment of the present invention coordinates the storage, creation, invocation and other functions required to manage a system of software objects. The environment 20 has a plurality of object brokers 22–22n (lower left) capable of communicating with location repositories 24–24n and profile repositories 26–26n through at least one communication channel 28 to initiate object operations. Implementation repositories 36–36n also are provided.

Figure 2:
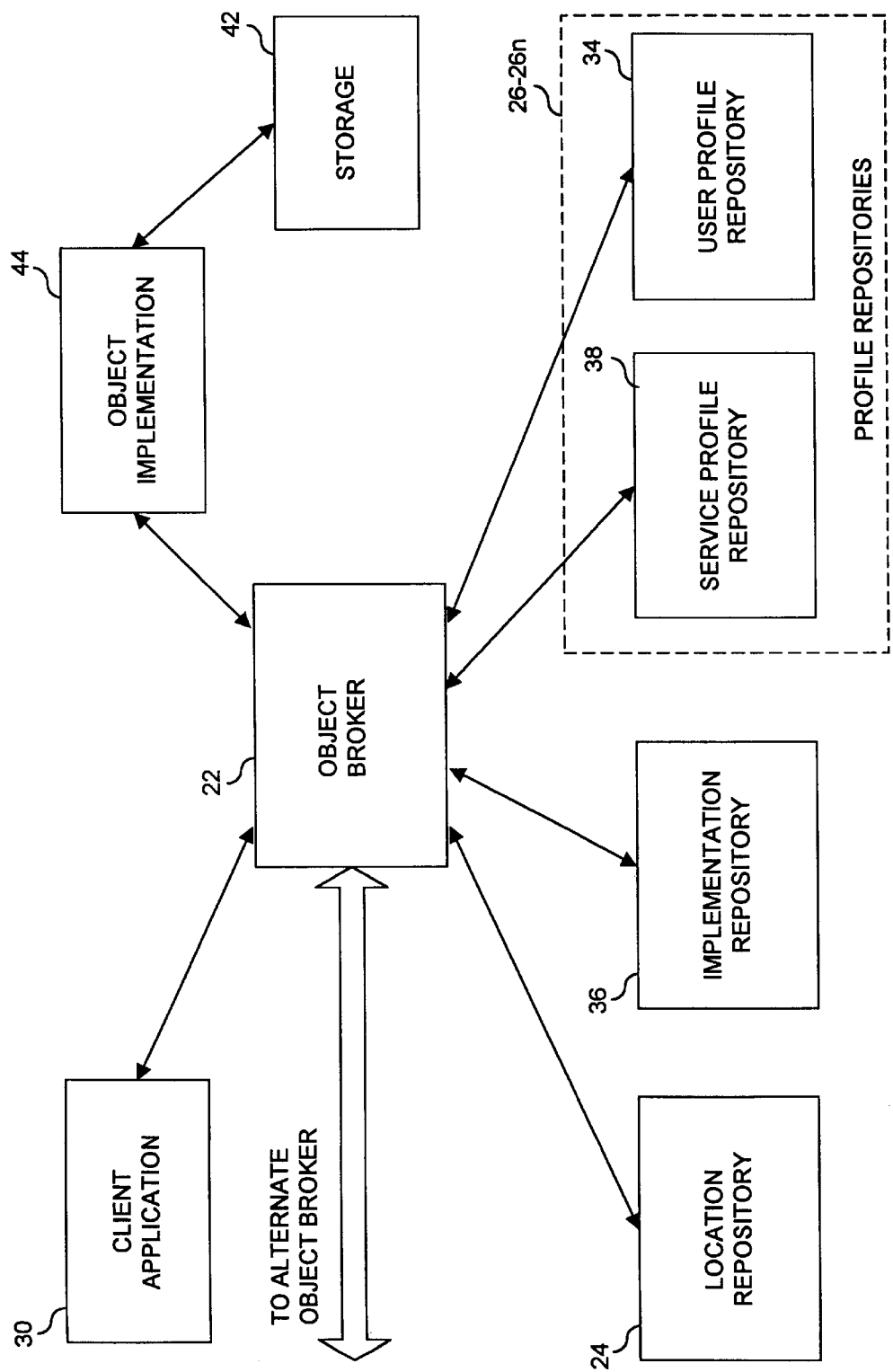
FIG. 2 is a block diagram of a portion of the system of FIG. 1 illustrating the flow of information in the course of object operations.

The initiation process is begun by a user (not shown) acting through one or more client applications 30 by sending an object operation request message to the object broker 22 for example. The storage location(s) of the object, and any restrictions as to which object brokers 22–22n are entitled to access the particular object , are obtained by addressing one of the location repositories 24–24n with a message identifying the object to be activated. In the illustrated embodiment, this may be accomplished by the object broker 22. Any established preferences for the manner in which the user or a group of users wishes to implement objects of this particular type are then obtained from the profile repositories 26–26n in response to user identity and object type information. Specifically, such preferences are obtained from a form of the profile repositories 26–26n, i.e., user profile repositories 34 (FIG. 2). To account for all contingencies, a set of default preferences contained in the profile repositories 26–26n also may be obtained by the object broker 22 in response to a message identifying the applicable operating system, object type and geographic or other service area. Armed with this information, the object broker 22 retrieves the executable code and data libraries required to perform object operations and configures, or otherwise customizes, the object to perform in the intended manner. Note that the environment of FIG. 1 also includes one or more administration tools 32 and one or more miscellaneous services 40 as will be described later.

Figure 3:
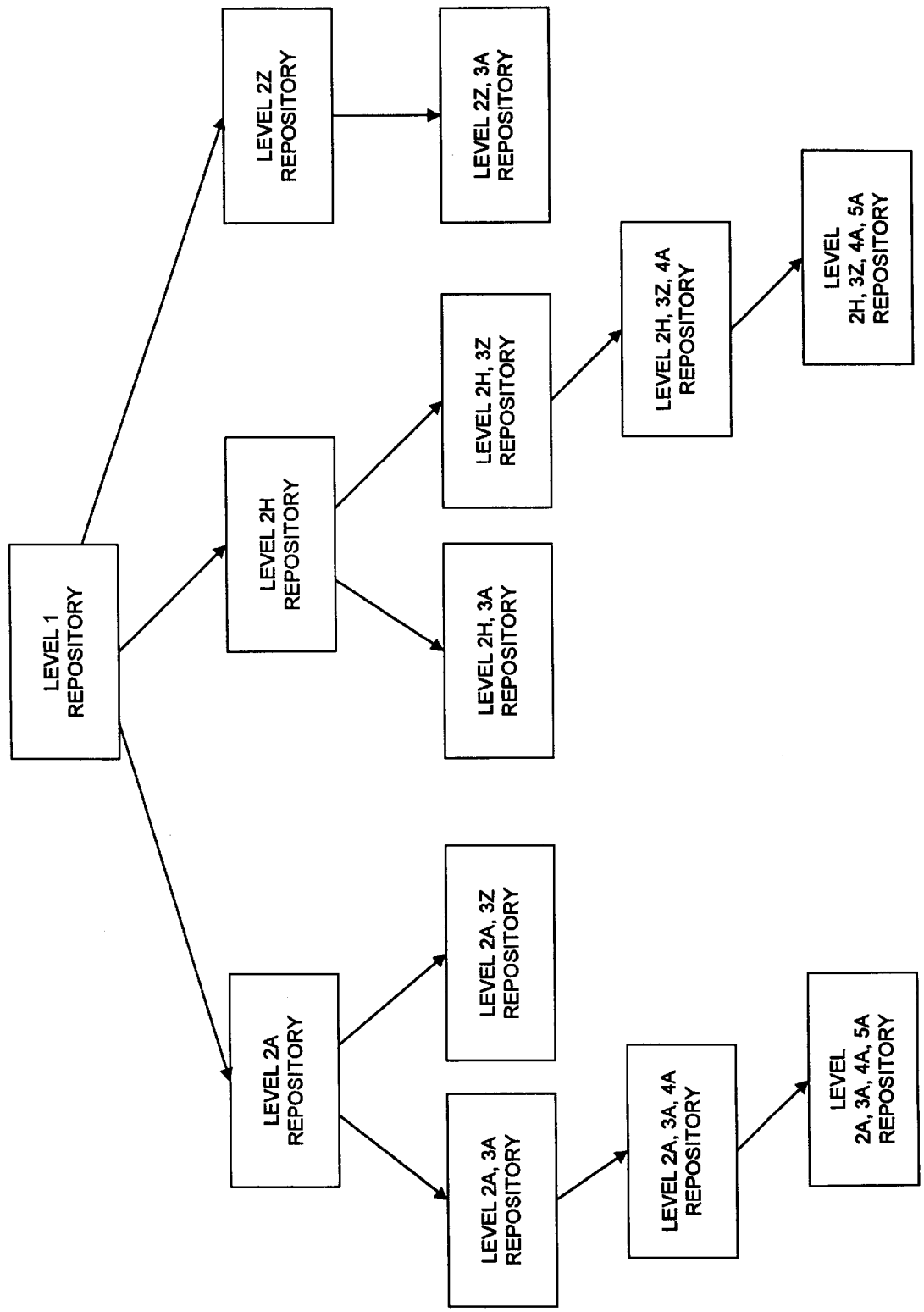
FIG. 3 is a block diagram showing the hierarchical arrangement of information repositories constructed in accordance with the invention.

The repositories (FIG. 1) of the invention are preferably arranged in hierarchies, as illustrated in FIG. 3. In order to provide access to repositories throughout the hierarchy, each branch of the hierarchy preferably has a separate repository (not shown) containing information on how to access the repositories in a hierarchy. In addition, information within the repositories is selectively replicated throughout the hierarchy depending on the demand that exists for that information.

Figure 4:
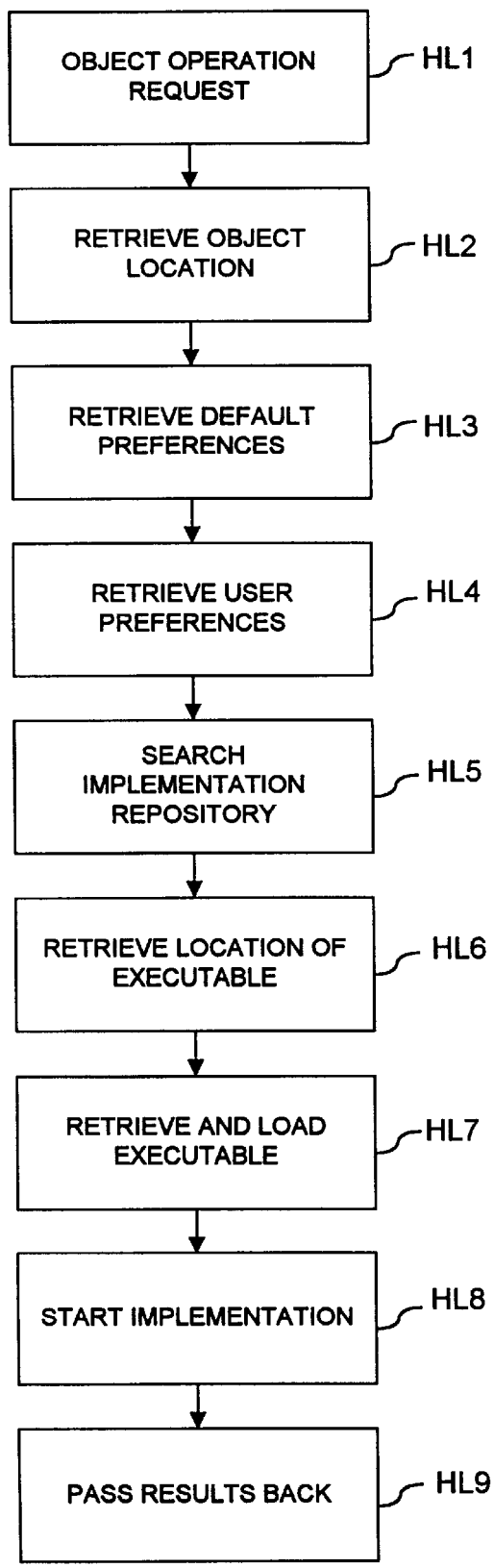
FIG. 4 is a high-level flowchart illustrating a sequence of steps performed in the course of object operations.

A high-level description of the program flow described above is depicted in FIG. 4. For purposes of ease of reference, the blocks of this flow chart will be preceded with the prefix "HL". As represented by Blocks HL1–HL4, a client application sends an object operation request message to the object broker 22 (FIG. 1) which, in turn, retrieves the location of the object and any applicable preferences from the location and profile repositories, 24–24n and 26–26n, respectively. As indicated at Blocks HL5–HL7, the object broker 22 uses this information to search an implementation repository 36–36n in order to retrieve the location of the executable and other information required to activate an object implementation. When this information is found, the object broker 22 retrieves it and loads it into the appropriate computing device. The object broker 22 then starts the object implementation and passes back any results from the implementation to the client application, as represented by Blocks HL8 and HL9.

A typical client application can take a wide variety of forms in the context of the present invention including, for example, a computer interface that enables the computer user to invoke object operation requests or a computer program that invokes an object operation request based on an occurrence in its program flow. Similarly, a client application can take the form of one object operation that invokes another object operation or any other computer application seeking to access information managed by the system.

The client application 30 may invoke an object operation by sending a message to the object broker 22 for example (FIG. 1) through the communications channel 28. The message identifies the object operation to be performed and includes any other parameters required. After the object broker 22 processes the message from the client application 30 and invokes the desired object operation, the object broker 22 passes any results from the object operation back to the client application 30.

The communications channel 28 typically is implemented using intra-process communications, e.g., subroutine calls, inter-process communications (through the operating system), or network communications (through a remote device over a network) depending on system and user requirements. For example, applications requiring high-speed communications to other applications on the same computer typically use intra-process communications. In contrast, applications communicating with geographically remote applications typically use some form of network communications. The implementation of these communication techniques is well known in the art and will not be described in detail here.

Administration tools 32 (FIG. 1, upper central) are used to administer the object-oriented environment 20. This use includes adding new objects to the system, upgrading the software in the system, changing the contents of the profile repositories 26–26n, adding new client applications and other basic system administration tasks. The administration tools 32 typically contain a user interface allowing a system administrator to access and alter the information in the system.

Miscellaneous services 40 (FIG. 1, upper right) typically include such services as billing services, security services, statistics services and delayed delivery services. These services are preferably used in any system where access to the system must be restricted, where users of the system must be billed for their usage, where the activity within the system is monitored in order to keep the system functioning smoothly, or where other specialized services are needed.

A typical implementation of the environment 20 includes numerous instances of each of the components illustrated in FIG. 1. For example, a particular system typically contains multiple client applications 30 and, as indicated, multiple profile repositories 26–26n. Also, as indicated, several object brokers 22–22n along with various administration tools 32 can be used depending on system resource demands and how the components of the system are distributed.

An examination of the object broker 22 and the information in the various repositories will illustrate how the object broker 22 uses information in the repositories to control the manner in which object operations are performed. Thus, the structure and operation of the object broker 22, the profile repositories 26–26n and the repository hierarchies are discussed hereinafter in detail.

| TABLE OF CONTENTS | |
|---|---|
| The Basic System | 15 |
|    Object Broker | 15 |
|    Repositories | 16 |
|       Location Repository | 17 |
|       Service Profile Repository | 19 |
|       User Profile Repository | 22 |
|       Implementation Repository | 27 |
|       Interface Repository | 31 |
| Object Operation | 31 |
|    Object Creation | 32 |
|    Object Activation | 42 |
|    Object Deletion | 46 |
| Repository Hierarchy | 46 |
|    System Profile Repository | 48 |
|    Locating a Repository | 50 |
|    Repository Replication | 56 |
|       Automatic Replication | 57 |
|       On-demand Replication | 60 |
| Example | 62 |
|    Log-in Procedure | 70 |
|    Creating the Video Mail Message | 73 |
|    Sending the Video Mail Message | 76 |
|    Viewing the Video Mail Message | 79 |

The Basic System

FIG. 2 shows some principal components of FIG. 1, as they are used in the course of a typical object operation. The client applications 30, an object broker 22 and implementation repository 36 are the same as those shown in FIG. 1, but the profile repositories 26–26n have been broken down into a service profile repository 38 and user profile repository 34. A storage 42 (FIG. 2, upper right) contains the object executable and library information and an object implementation 44 performs the actual execution of an object operation. The arrows between the blocks indicate message flow between the representative blocks over any of a variety of communication channels (not shown).

Object Broker

The object broker 22 handles object operation requests from the client application 30. In a typical embodiment of the present invention, the object broker 22 is based on the Object Request Broker and the Object Adapter, as disclosed in the CORBA document previously incorporated by reference. The implementation and functionality of the object broker 22 in a typical embodiment generally follows the details set forth by CORBA. Deviations from, or additions to, the CORBA design are disclosed herein where appropriate.

As indicated above, more than one object broker 22 may exist in a system depending on the resources available in the system and the needs of the system. For example, as the number of client applications 30 increases, either the speed with which the object broker 22 operates must increase or more object brokers 22–22n (FIG. 1) must be distributed throughout the environment 20 in order to prevent the object broker 22 from becoming a bottleneck and slowing down the speed at which the client application operation requests are processed.

Typically, more than one object broker 22 is likely to be used and the object broker 22 can pass object operation requests to other object brokers in the system. This provides the capability to distribute system processing loads while maintaining a way to locate all objects within the system. The mechanics of an object operation from request to completion will be discussed in detail below.

Repositories

The present development uses various information repositories to store preferences, defaults and other information used to manage system resources in the course of object operations. A typical embodiment, as disclosed herein, uses an implementation repository 36 that holds the information indicating where the executable and library information used to implement object operations is located, as well as an interface repository (not shown) that contains information used by the object broker 22 to interpret object operation requests and by client applications 30 to access new objects. This embodiment may also use a service profile repository 38 that contains storage information, processing information and other default information for a given service category, which may be a geographic area or other organizational division. A typical embodiment also includes a user profile repository 34 containing storage information, processing information and other user preference information for a given user. The location repository 24 contains information identifying the location of objects in the system.

The information in the profile repositories 26–26n may be stored in a variety of ways, such as random access memory, file system storage, data base storage, a DCE directory or an X.500 directory. These and other methods of storing data in computer systems are well-known in the art and are not discussed in detail here.

A typical embodiment of the profile repository 26 also has a storage interface between the profile entries and the actual storage resource. This enables the actual storage resource to be changed, as needed, without impacting the profile entries themselves.

Location Repository

The location repository 24 is made up of a plurality of location entries, each of which contains location information for a particular distributed object of the system. For example, these location entries are used by the object broker 22 to locate a distributed object specified by an object operation request of the client application 30. The object operation request contains a reference to the specified location entry. The object broker 22 uses this reference to locate the corresponding location entry in the location repository 24 and uses the location entry information, in turn, to locate the object. As shown in TABLE 1, a location entry typically contains Data Storage Locations, an Object Broker Restriction Flag, and Accessor Object Broker lists.

TABLE 1

Location Repository

Object #1:
    Data Storage Locations:
        Location #1
        .
        .
        .
        Location #n
    Accessor Object Brokers:
        Object Broker #1
        .
        .
        .
        Object Broker #n
    Object Broker Restriction Flag
Object #2:
    .
    .
    .
Object #n:

Each Data Storage Location contains information that identifies where data associated with an object is stored. In the illustrated embodiment, the Data Storage Location information is the name of a file, a database entry or other storage reference containing this data. Multiple locations are specified in TABLE 1 because a given object may have more than one set of data.

By using a separate location entry to locate an object instead of embodying the address of the object itself in a client application, the location of the object can be changed without changing the reference string used by other system components use to access the object. According to the invention, the system components that access the object always use a fixed reference to the object—namely, the location repository entry. By changing the data storage location within the location repository, however, the actual location of the object can be changed. Consequently, if an object must be moved to reallocate system resources or for some other reason, the client applications 30, object implementations 44, and other system components that access the object need not be changed in order to access the object at its new location.

The Object Broker Restriction Flag in the location repository 24 is used to force the object broker 22 to pass the object operation request to another object broker. The flag allows the processing of object operations requests to be distributed throughout the system as required to redistribute the load on a particular object broker 22 to other parts of the system. Thus, some object operations are limited to specific parts of the system. Also, redistribution may serve some other purpose.

The Accessor Object Broker lists of the location repository 24 store information about the object brokers that can process an object operation request for a particular object. In a typical embodiment, these lists are used when an object broker restriction flag is set to disqualify the current object broker 22 from handling a particular object operation request. This information includes any network information and network protocol information required to communicate with other object brokers.

Service Profile Repository

The service profile repository 38 contains a plurality of service profile entries each of which contains service profile information for a particular distributed object of the system. Service profile entries are used by the object broker 22 to manage system resources in the course of object operations. In a typical embodiment of the present invention, the service profile entries contain storage information, processing information, and other default information for a given service category. A service category is defined as a set of objects within a particular geographical area, a set of objects within certain divisions of a particular organization, or any other related set of objects.

In a typical embodiment, service profile entries are used by the object broker 22 when the object broker 22 receives an object operation request for a particular object from a client application. The object broker 22 accesses the service profile repository and retrieves the information in the service profile entry. The object broker 22 then uses this service profile information to activate the particular object's implementation. As shown in TABLE 2, a service profile entry typically contains Search Parameters, Object Resource Assignments, Object Creation Information and Operating System Defaults.

TABLE 2

Service Profile Repository

Object Type #1:
    Search Parameters:
        Object Type Name
        Object Type Version
        Replication Control
        Last Update Time
        Last Access Time
    Object Resource Assignments:
        Object Storage Information
        Available Object Brokers
        Location Object Storage Information
        Default Attribute Values
    Operating System Implementation Defaults:
        Operating System #1:
            Implementation #1
            .
            .
            .
            Implementation #n
            Default Implementation
        Operating System #2:
        .
        .
        .
        Operating System #n:
    User Profile Required Flag
Object Type #2:
    .
    .
    .
Object Type #n:

The Search Parameters perform two functions. First, the object-type name and version is used by the object broker 22 to match the information in a repository with the object type to be activated. Second, when the service profile repository 38 is set up in a hierarchy of repositories, the revocation control and last update and access time information are used to determine when information is to be replicated to other repositories in the hierarchy.

In a typical embodiment, the Object Resource Assignments provide information regarding available object brokers, object storage assignments, location repository assignments and default object attributes. A list of object brokers capable of handling object operation requests for a particular object type is maintained for use when a first object broker 22 cannot handle the object operation request for some reason. The object storage assignments specify where information associated with a given object type is to be stored. This information is passed by the object broker 22 to the object implementation 44, which uses the information if data storage is needed during implementation of the object. The location-repository assignments information specifies which location repository should be used to store the location entry for a given object. By so specifying at the object-type level, objects can be distributed physically throughout the system as system resources or storage capabilities require. The default object attributes are used to specify an object's operational characteristics when a new instance of an object of a particular type is created. During an object "create" operation, the object broker 22 passes the default object attribute information to the entity implementing the create operation.

The service profile entries provide a mechanism for readily accessing implementation information to be used with a particular object in a particular operating system. This information is desirable in systems where an object operation might be invoked on different types of operating systems that require different environmental information. For example, a program running under Microsoft Windows requires environment variables, search paths, ini-file entries and custom files in specific locations. In contrast, a UNIX application requires data from an .Xdefaults file, environment variables, search paths and custom files in specific locations, and an Apple Macintosh environment requires custom files and resource fork files.

Referring to TABLE 2, in a typical embodiment, each service profile entry contains a plurality of items of information representing a particular type of operation. For each type of operating system, information is stored for use when the particular object is implemented on the specified type of system. Thus, operating system information such as environmental variables, search paths, system configuration files, or other operating system information can be stored for each operating system on which a given object may be implemented.

In addition, a user may have a number of implementations for any given operating system. Thus, each operating system can support any number of operating system implementations and from these implementations, a user selects a preferred implementation.

User Profile Repository

The user profile repository 34 (FIG. 2, lower right) contains a plurality of user profile entries each of which contains profile information for a particular user. This information is used to manage system resources in the course of object operations and to provide information about particular users to whatever components of the system require it. In a typical embodiment, the user profile entries contain storage Information, Processing Information, and other preference information the system requires to invoke a particular object operation for a given user. In addition, the user profile object contains information relating to the user's access and use of the system.

When a user is a person seeking to make use of the system, he or she is typically identified by a user name typed in upon entering the system. In other circumstances, a user may be an automated computer program that uses the system's resources. One example of such a program would be a background maintenance routine invoked automatically by the system. In either case, an identification string assigned to the user is passed to the user profile repository 34 to retrieve the corresponding user profile entry.

User profile entries may be retrieved by a variety of different components of the system. Object brokers retrieve them, as when the object broker 22 receives an object operation request from a client application. In addition, system log-in routines that verify whether a user is authorized to access the system can retrieve the user profile entries. User profile entries can also be used by certain object implementations or administration tools.

As shown in TABLE 3, user profile entries in a typical embodiment of the invention contain System Resource Assignments, Implementation and Interface Repository Location Information, Distributed Object Information, User Demographics, User Top Container, and Billing and Statistics Information.

TABLE 3

User Profile Repository

User #1:
    User Top Container:
        Object #1
        .
        .
        .
        Object #n
    User System Resource Assignments:
        Home Implementation Repository
        Home Interface Repository
        Billing and Statistics Information
    Object Type Entries:
        Object Type #1:
            User Object Resource Assignments:
                Object Storage Information
                Available Object Brokers
                Location Object Storage Information
                Default Attribute Values
            Operating System Implementation Preferences:
                Operating System #1:
                      Implementation #1
                      .
                      .
                      .
                      Implementation #n
                      Default Implementation
                Operating System #2:
                .
                .
                .
                Operating System #n:
            Object Destination Container
        Object Type #2:
        .
        .
        .
        Object Type #n:
    User Demographics
User #2:
    .
    .
    .
User #n:

The User System Resource Assignments contains information identifying the system resources of a particular user. In a typical embodiment, this information includes Home Implementation and Interface Repository Information, Profile Repository Service Information, and Billing Service and Statistic Service Information.

The Home Implementation Repository Information identifies the server or servers that provide access to the user's primary implementation repository. This information is used if it becomes necessary to redistribute the load on a particular repository to other repositories, or if becomes necessary to use different servers to access the repository. The Home Interface Repository Information provides this same type of information for the user's Home Interface Repository.

The Profile Repository Service Information identifies the server or servers that provide access to the appropriate user profile repository for a particular user. In a typical embodiment, this information is used by a login application to locate the user profile repository of the user accessing the system.

The Billing Service Information is used to bill a user for use of the network and other system services. The Statistics Service Information identifies the server or servers that manage the user's statistics.

A user's Distributed Object Information contains information used to manage system resources in the course of object operations invoked by the particular user. In a typical embodiment, the user profile Distributed Object Information contains information similar to that stored in the service profile entries; namely, Object Resource Assignments and Operating System Implementation Information.

The User Object Resource Assignments give the user the ability to manage the user's system resources based on the particular object type of the object operation being performed. As shown in TABLE 3, the User Object Resource Assignment contains information similar to that stored in the system profile entries as Object Resource Assignments.

The Operating System Implementation Information is also used to tailor the implementation of an object operation to a particular operating system. Again, in a typical embodiment, this information is the same as that stored in the service profile object.

Since the user profile entries and the service profile entries contain overlapping information, a typical embodiment uses the information in the user profile entry when such is present, and uses the information in the service profile entries when more specific information is not found in the user profile entries. This provides a mechanism of providing default implementation preferences while allowing a user to override the defaults and customize object operations, as needed.

Object Resource Assignments also typically contain object destination information which assigns specific destination containers for objects invoked by the user. This allows a user to specify the destination for objects based on the type of object received.

User Demographics contains information used when a user accesses the system. It typically includes the user's name, the user's password, and information about the user's standard computer environment. This information is used to ensure that the user is authorized and to set up the user's interface to the system.

The User Top Container identifies the set of objects a particular user can access. This information is typically used by a computer program that displays the user's interface in order to display the objects available to that user.

Using the user profile repository 34 to store User Preferences provides a unique advantage in that a user can access his home environment from any point in the system. Since the Operating System Implementation Information and Resource Assignment Information is contained in the user profile repository, which is accessible anywhere in the system, a user can access this information anywhere. Thus, if a user accesses the system from a computing device that is the user's usual home environment, the above information can be used to make the device operate like the user's home environment.

Implementation Repository

The implementation repository 36 (FIG. 2, lower central) contains information used to activate an object implementation. The implementation repository is typically divided into a number of modules. In turn, each module contains a number of object-type entries which contain the implementation information for a particular type of distributed object. In order to simplify the terminology used in this document, the term "object type" will be used to refer to a particular object type entry in a given module.

The object type entries contain the implementation information needed to activate an object of a particular type. In a typical embodiment, the object broker 22 retrieves the implementation information for the particular object from the implementation repository 36 using a variety of search parameters. The search parameters are used to select an implementation appropriate for the type of hardware, operating system, and other implementation preferences required for the particular object operation. The information passed back from the implementation repository includes that required to access the code to be executed and the libraries to be used in activating the object implementation.

As shown in TABLE 4, the implementation repository 36 arranged according to the illustrated embodiment contains object-type entries which contain search parameters and implementation information for various object types. These object-type search parameters permit the actual executables and libraries used to implement an object operation to be selected based on system needs or user preferences.

TABLE 4

Implementation Repository

Module #1:
    Object Type Entries:
        Object Type #1:
            Search Parameters:
                Operating System
                Implementation Preference
                Network Protocol
                Hardware Platform
                Object Type Name
                Object Type Version
                Object Broker Vendor
                Replication Control
                Last Update Time
                Last Access Time
            Executable Information:
                Executable Name
                Executable Path
                Executable Storage Location
                Executable Storage Type
                Library Path
                Runtime Library #1:
                    Library Name
                    Library Storage Location
                    Library Storage Type
                Runtime Library #2:

Runtime Library #n:
        Object Type #2:

Object Type #n:

TABLE 4-continued

Implementation Repository

Module #2:
.
.
.
Module #3:

Referring now to the specific entries of Table 4, the Operating System Name indicates the type of operating system used on the computing device requesting the implementation information. The Network Protocol identifies the network protocol of the network over which the requesting device communicates. The Hardware Platform indicates the type of computing device hardware on which the implementation will run.

The Implementation Preference indicates an object implementation preference that is matched with the implementation preference information stored in the user profile repositories and the service profile repository. Thus, the object broker 22 compares the information retrieved from the various repositories in order to determine which implementation is to be used. This occurs when the contents of the implementation repository are retrieved.

The Object Type Name indicates the type of the object being invoked, and the Object Type Version is an optional parameter allowing different implementation versions to exist.

The contents of the Object Broker Vendor entry is used to retrieve an implementation matched to a particular object broker vendor. This allows a particular implementation repository to service multiple object broker vendors.

The implementation repository object-type search parameters also include Replication Control, Last Update Time and Last Access Time information. This information is used to replicate information throughout the hierarchy on an as-needed basis when the implementation repository is part of a hierarchy of such repositories.

Once an object broker 22 matches a desired implementation with an entry in the implementation repository, the object broker 22 retrieves the implementation information associated with that entry.

The Object Type Implementation information contains Activation Policy Information, Executable Information and Operation Information. Of these, the Activation Policy determines how the implementation is loaded. Typical activation policies may include persistent server, shared server and server-per-method, or any other activation technique known in the art.

The Executable Information may be used to access the executables, the libraries and any other information required to perform the actual object implementation. As shown in TABLE 4, Executable Information includes a number of entries. Of these, the Executable Name is the name of the executable file. The Executable Path is the exact file path to be used on the computing device for the executable. The Executable Storage Location is the actual location where the executable has been centrally stored or, in the alternative, the name of a service profile entry specifying the actual storage location. The Executable Storage Type indicates whether the executable is stored in a file system or a database for downloading or stored in an area to be linked into the file system space of the user's computing device.

In addition to executable code, many applications use information contained in libraries to perform their operations. The Library Path Name is the exact file path used on the computing device to access the libraries. Run-Time Libraries are those linked to the computing device during run time. They can therefore be accessed by the executable after the executable is compiled. In one embodiment, the information stored in a Run-Time Library includes the name of the library, the actual location where the library has been centrally stored or, alternatively, the name of a service profile entry that specifies the storage location, the storage type and how the executable is stored.

Since the implementation repository 36 can be searched using the Object Type Version as a parameter, the present invention provides a unique method for maintaining the software applications. The maintenance tools can use this information to search the implementation repositories for outdated versions of a particular implementation and upgrade it to the new implementation, if required.

In addition, by specifying the storage locations of the libraries and the executables in the service profile repositories, multiple servers can provide the needed executables and libraries. This enables system resources to be distributed as widely as required.

Interface Repository

The interface repository (not shown) is used by client applications to build requests for object-types that were not known when the application was built. In addition, the interface repository is used by the object broker 22 to interpret incoming operation requests and parameters. The interface repository stores interface information for multiple object types. In turn, each object type can have multiple interfaces, depending on a variety of parameters. Thus, in order to retrieve the interface for a given object type, the desired parameters must be compared with the search parameters in the interface repository. The basic operation and implementation of an interface repository constructed according to an exemplary embodiment of the present invention is described by the CORBA specification referenced above, the disclosure of which has previously been incorporated by reference.

Object Operation

The steps performed by an object broker 22 (FIG. 2) during a typical object life-cycle will now be examined to illustrate how the object broker 22 uses information in the profile repositories to control the manner in which object operations are performed.

Before an object operation is invoked, certain information needs to be installed in the system by the administration tools 32 (FIG. 1) or some other appropriate mechanism. This information includes the object definitions for the particular object type and the executable and library information that perform the object's operations. In addition, the object creation parameters, default preferences, and user preferences used to create and activate a particular object are stored in the user and service profile repositories. The executable and library information associated with the default and user preferences is then stored in the implementation repository 36 (FIGS. 1 and 2) in a manner that allows the proper executable and library information to be retrieved using the appropriate preference information.

Once a particular object type is installed in the system, object operations of that type are invoked by creating an instance of that object type and then activating the instance of the object. Once an instance of an object is no longer need, the instance previously created is deleted. Thus, the life-cycle of an object, in a typical embodiment of the present invention, consists of the creation, activation and deletion of an instance of that object type.

Object Creation

Figure 5A:
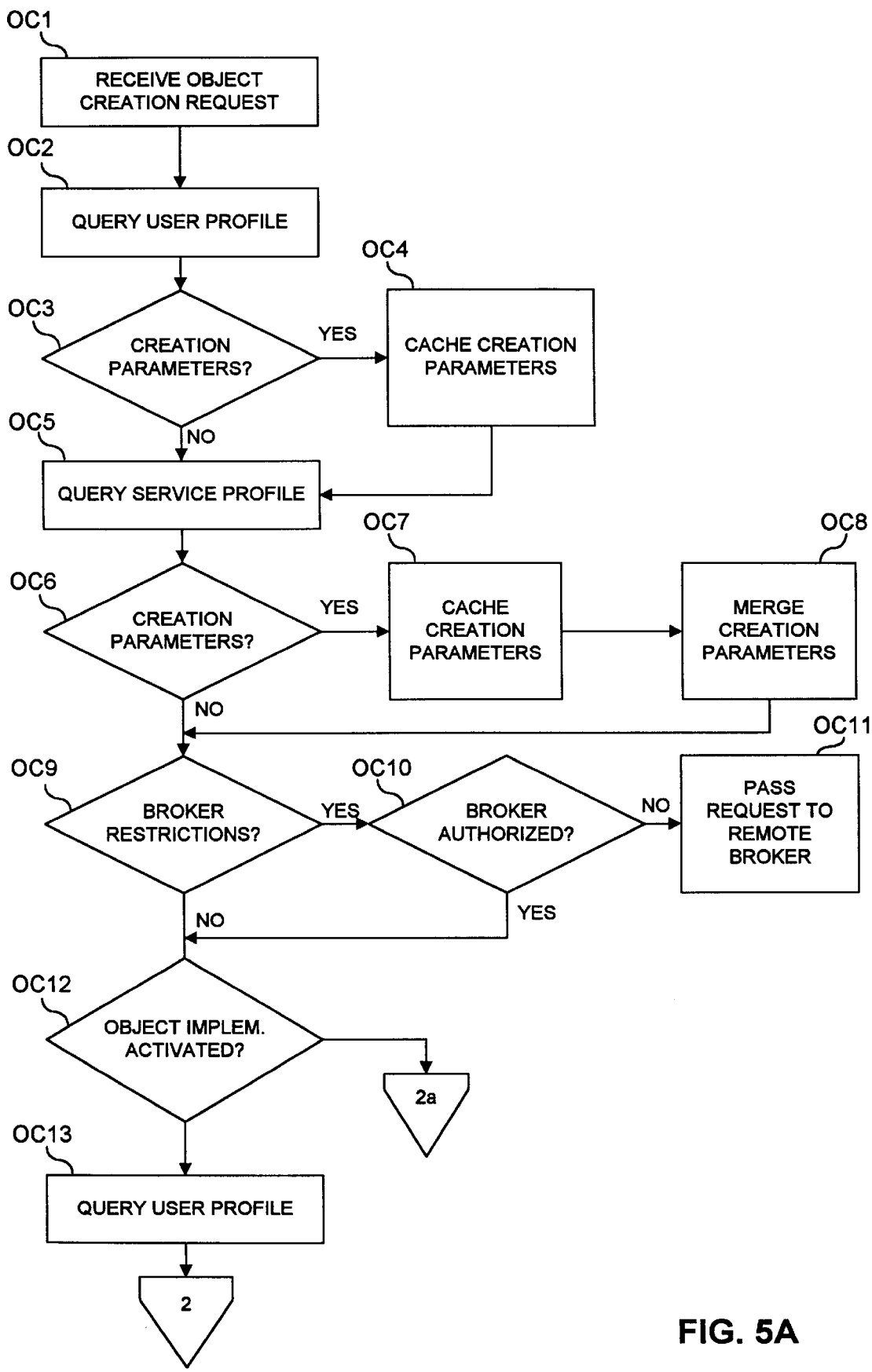
FIGS. 5A, 5B and 5C together constitute a flowchart illustrating a sequence of steps performed in creating an instance of an object in accordance with the teachings of the invention.
Figure 5B:
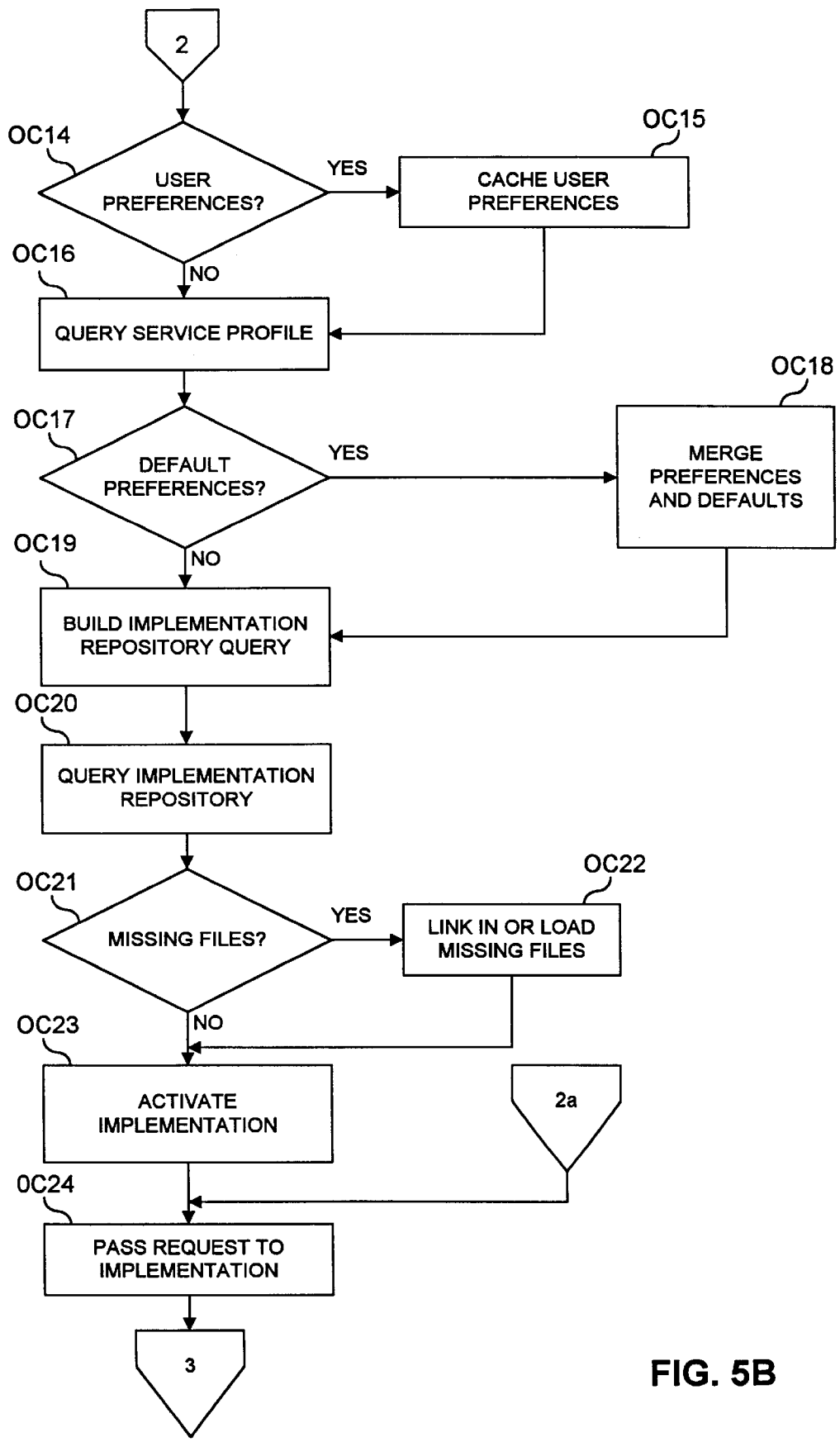
Figure 5C:
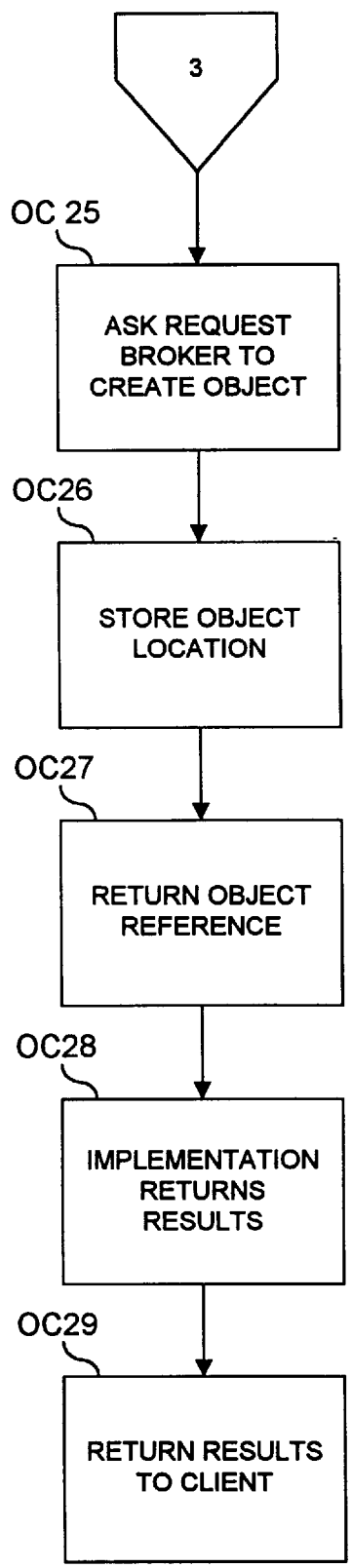

FIGS. 5A, 5B and 5C, hereinafter referred to collectively as FIG. 5, illustratively describe the object creation ("OC") procedure in which an instance of a particular object type is created. After receiving an object creation request from a client application 30 (FIG. 1), the object broker 22 queries the profile repositories 26–26N to retrieve object creation parameters required by the object creation implementation. The object broker 22 then queries the profile repositories 26–26n to retrieve user and default preferences that are used to select the proper implementation for the create operation. After the object broker 22 starts the implementation, the implementation stores the newly created instance of the desired object type. Then, after the implementation is complete, the object broker 22 passes the object reference of the newly created object back to the client application 30.

Considering now the object creation operation in more detail, a client application 30 initiates the creation of an object at Block OC1 by sending an object creation request message to its object broker 22. This object creation request message contains an object type parameter which identifies the particular type of object to be created and any required parameters or other information needed to perform the create operation. The object broker 22 then accesses the user profile repository at a Block OC2 to retrieve any object creation parameters that have been defined for this particular object type by the user invoking the client application.

Figure 8:
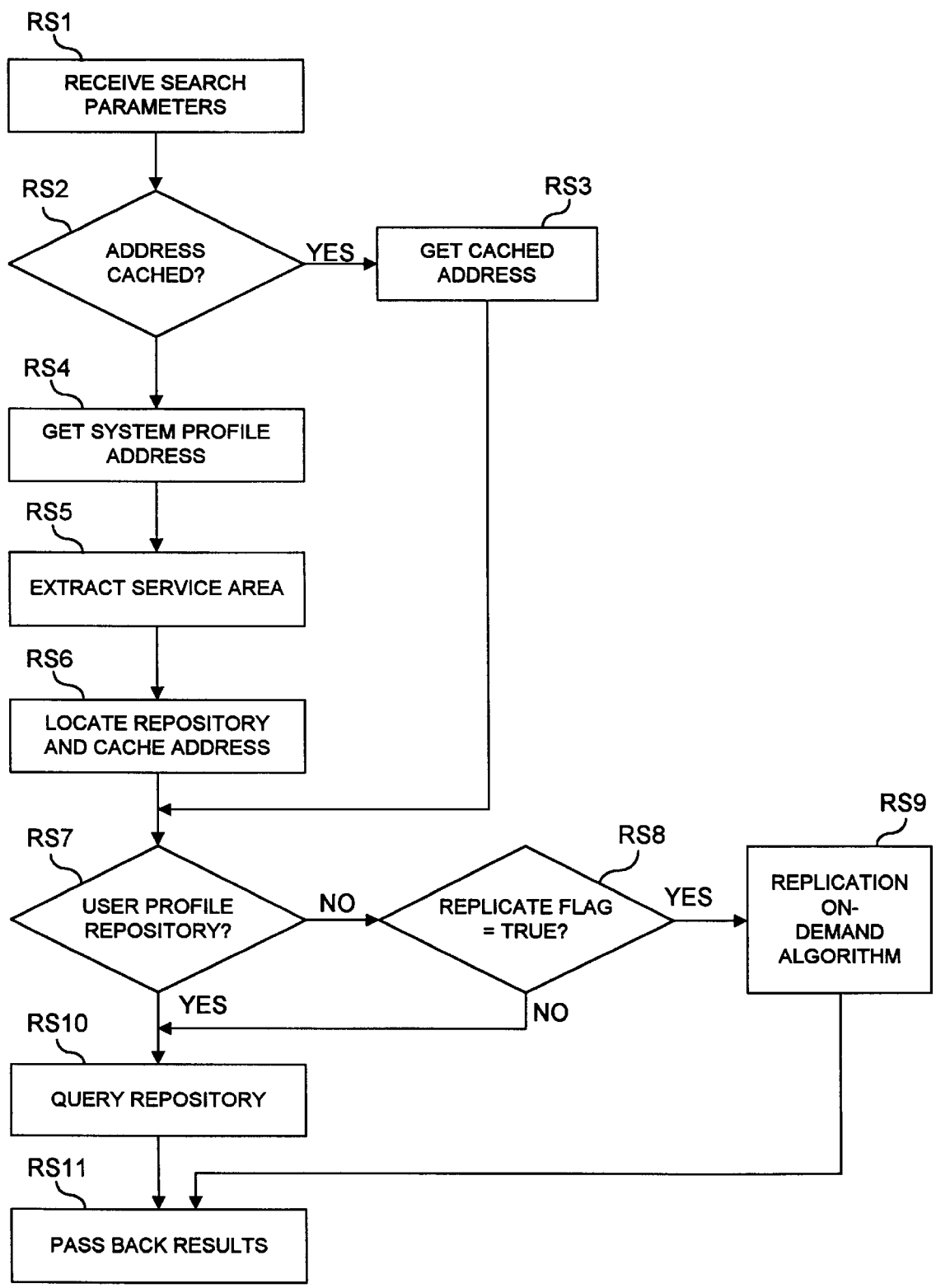
FIG. 8 is a flowchart illustrating a sequence of steps performed in searching through a repository to retrieve its contents in accordance with the teachings of the invention.

In order to retrieve information from a repository, the address of the repository and any parameters required to find the desired data within the repository must be passed to the profile repository search ("RS") routine depicted in FIG. 8. These parameters are used when the information in the repository is subdivided into various categories.

Referring now specifically to FIG. 8, in a search of the user profile repository 34, the parameters referenced at Block RS1 includes profile repository type, service area, user identification, object type and operating system type. The address of the profile repository is obtained using the service area of the repository and the repository type. As shown in TABLE 3, the information in the user profile repository is divided into several categories. Thus, in order to access the correct information, the User Identification, the Object Type, and the Operating System Type parameters may be required.

The search routine then checks at Block RS2 to see whether the repository address has been cached. The address of a user profile repository is normally cached when the user "logs in" to the system, as described below in connection with a typical "log in" procedure.

If the repository address has not been cached, the address of the repository must be obtained. The address of the local system profile repository (not shown) is then retrieved, as represented by a Block RS4, and the local service area is retrieved from that system profile repository, as represented by a Block RS5. As indicated summarily at a Block RS6, the system profile address and the local service area are then passed to a locate repository routine (FIGS. 9A, 9B and 9C) which is discussed in detail below. If, on the other hand, the repository address has been cached, the cached address is retrieved (Block RS3).

If the repository being searched is a user profile repository 34, the information in the repository being searched is not replicated to other repositories since, as discussed in detail below, only the information required to locate a particular user profile repository is replicated throughout the repository hierarchy. This operation step is depicted by a Block RS7 of FIG. 8.

As represented by a Block RS10, since the repository to be searched is a user profile repository 34, the search routine queries the repository using the parameters passed in at the Block RS1. Since the information in the user profile repository is grouped according to user (Table 1), the object broker 22 first uses the user identification parameter to find the correct user entry in the repository. Next, since each user entry typically contains multiple object type entries, the object broker 22 uses the object type parameter to find information that corresponds to the particular object type requested.

As represented by a Block RS8, if the repository being searched is another type of repository, such as a service profile repository 38 or an implementation repository 36–36n, the search routine checks the replication flag (binary) that was passed in as a parameter. If the flag is set to TRUE, the search routine calls the on-demand replication routine of FIG. 11 which is described in detail below. This step is depicted at a Block RS9.

As represented by a Block RS11, the contents retrieved from the repository are passed back to the routine that called this routine, which in this case is a step of the Block OC2 representing the object creation procedure of FIG. 5.

With continuing reference to FIG. 5, as represented by a Block OC3, the information retrieved from the user profile is checked for any object creation parameters. These parameters are stored in the object resource assignments and, as shown in TABLE 3, include entries for default object attributes and available object brokers. As represented by a Block OC4, if any object resource assignment information is found, it is stored available to be merged later with similar information from the service profile repository 38 and passed to the object creation implementation 44.

Next, with reference to a Block OC5, the service profile repository 38 is searched for creation parameters. The object creation parameters stored in a service profile repository 38 are used for all object creation operations performed in the service area corresponding to that repository. A service area can be defined based on geographical boundaries, organizational lines, or any other classification where it is desirable to have common object behavior. For example, it is sometimes desirable to assign each user in a given division of a business the same default object activation preferences and object creation parameters. In this case, these preferences and parameters are then stored in one or more service profile repositories, e.g., repository 38, that serve the service area defined by the business division.

The object broker 22 thus searches the service profile repository 38 (Block OC5) to get any object creation parameters stored in it. The service profile repository search is conducted in essentially the same manner as the user profile search discussed above.

Referring now to FIG. 8, the search parameters used in the Block RS1 are slightly different in a service profile repository search. As TABLE 2 indicates, information in the service profile repository 38 is not grouped according to user; therefore, no user identification parameters would be used. In addition, since the information in a service profile repository, e.g., repository 38, may need to be replicated throughout the hierarchy, a replication flag parameter is used. Finally, as shown by TABLE 2, a number of other search parameters, such as Object Type Version, Update Time, and Access Time, may be required to access the proper information in the repository.

Since a service profile repository 38 is being searched, the profile search routine checks the replicated flag, as indicated at the Block RS8. If the flag is set to "TRUE," the repository information must be replicated and the search invokes the replication on-demand routine, as indicated at the Block RS9. The replication on-demand routine then queries the repository, performs any needed replication, and passes back the information retrieved from the repository. If the replication flag is not set to "TRUE," the service profile repository is queried using the object type parameter to find the proper object type entry information in the repository, as indicated at the Block RS10.

As represented by the Block RS11 of FIG. 8, the results of the service profile search are then passed back to the program that called this routine, which is the object creation procedure illustrated by FIG. 5.

Returning to FIG. 5, a Block OC6 illustrates that the information retrieved by the service repository search is checked to see if any object creation parameters were defined for this particular object type in the service area specified. As TABLE 2 shows, each object type entry in the service profile repository 38 has an Object Resource Assignment entry which contains Default Object Attributes, Available Object Brokers, and other object creation parameters. The object creation parameters for this service area and object type are then stored, as shown at a Block OC7.

The object creation parameters obtained from the user and service profile repositories, e.g., repository 38, if any, are then merged at a Block OC8 and all of the parameters are stored so they can be passed later to the create operation implementation. When the parameters are merged, those defined in the user profile repository 34 override any conflicting parameters defined in the service profile repository 38. For example, if both the user and service profile repositories defined the Location Object Storage Information shown in TABLES 2 and 3, the Location Object Storage Information of the user profile repository would be used. If the user profile repository 34 did not define this parameter, however, the information in the service profile repository 38 would be used.

Moving to a Block OC9, the object broker 22 checks the available object brokers entries in the user and service profile repositories (34 and 38), as defined by TABLES 2 and 3. If there are no object brokers specified by the available Object Brokers Entries, any object broker 22 can handle the particular object creation request and, consequently, the object broker 22 handling the object creation operation will continue to do so.

If there are object brokers 22–22n specified by the available object brokers entries, however, only those object brokers specified can handle the object creation operation, e.g., broker 22. Therefore, the object broker 22 currently handling the request must verify that it can handle this request, as represented by a Block OC10. If the particular object broker 22 cannot handle the request, it passes the request to another object broker 22–22n as represented at a Block OC11, causing the procedures described here to be performed by another object broker.

As depicted in a Block OC12, if the initial object broker 22 can handle the object operation request, the object broker 22 determines whether the object implementation 44 for this object type is already activated. If the object implementation 44 is already activated and can service multiple objects, the object broker 22 passes the object operation request directly to the object implementation 44 in order to perform the operation.

If the implementation is not activated or cannot service multiple objects, the object broker 22 queries the user profile repository 34 to retrieve the user's implementation preferences for the operating system that will run the "create" operation (Block OC13). This query is conducted basically as described above in reference to the Block OC2, with the object broker 22 using the user identification and object type parameters to access information pertaining to the specified user and object type. In addition, however, an additional parameter specifying an operating system is used because the object operations invoked by a user may operate on a variety of operating systems and the implementation for an object may vary from one operating system to the next. Therefore, each object type entry in the user profile repository 34 can have several operating system entries each of which contains implementation information required to perform an object operation on a particular operating system.

The information retrieved from the user profile repository 34 is checked at a Block OC14 to see if any of the user operating system implementation preferences listed in TABLE 3 have been defined. If so, the information is stored as indicated at a Block OC15 so it can be merged later with similar information from the service profile repository 38 and used to build the implementation repository search query which is described in more detail below.

Next, as represented by a Block OC16, the service profile repository 38 is searched for any default operating system implementation preferences that apply to the particular user's service area. As in the query of the service profile repository at the Block OC5, the service area and object type parameters are used to retrieve the information for the desired service area and object type. In addition, as in the query of the user profile repository 34 for user implementation information described in conjunction with the Block OC13, the operating system parameter is used to find the service area's default implementation information for the specified operating system type.

As depicted in a Block OC17, the information retrieved from the service profile repository 38 is checked to see if any default implementation preferences are defined. If so, this information is merged (Block OC18) with the user implementation preference information, if any, and is stored for use in building the query for the implementation repository (36–36n). Again, when this information is merged, the parameters defined in the user profile repository (26–26n) override any conflicting parameters that are defined in the service profile repository 38.

Now that the creation parameters, implementation preferences and implementation defaults for the object being created have been retrieved, the object broker 22 must access the implementation repository to locate the executable and library information required to activate the create operation implementation.

As illustrated at a Block OC19, the implementation repository query is built using the object type and operating system parameters obtained earlier. The implementation preferences retrieved from the user and service profile repositories and merged as described at the Block OC18 are also used, along with the hardware platform, network protocol, and object broker vendor parameters. The hardware, network, and vendor parameters are typically defined when the system is configured and depend on the system resources being used.

As represented by a Block OC20, the object broker 22 then accesses the implementation repository using the profile repository search routine discussed earlier. The implementation information for a particular object type is thus retrieved by identifying the appropriate module and object type, as shown in TABLE 4. The remaining parameters, as discussed above in connection with the Block OC19, are compared with the object type search parameters of TABLE 4. If a match of all the parameters is found, the corresponding object type implementation information (also shown in TABLE 4) is passed back to the object broker 22. This object type implementation information is the executable and library information that performs the object creation implementation. This includes the name of the executable or library, the file paths to be used on the computing device for the executable or libraries, the storage 42 location or other location where the executable and libraries are stored, and other implementation information.

Next, as depicted in a Block OC21 and a Block OC22, the executable and library information obtained from the implementation repository is compared to any comparable information already in place on the computing device that will run the implementation. If any part of this information is not already in place on the computing device, it is linked in or loaded onto the computing device at this time. The object broker 22 thus links in the implementation information or downloads any implementation information from the storage 42 or other remote storage, and activates the object implementation 44 (Block OC23). The object broker 22 then passes the create operation request to the object implementation 44 at a Block OC24 along with the creation parameters described earlier. The object implementation 44 uses the object storage information that was obtained in a prior access of the user profile repository (see TABLE 3) to store the attributes of the newly created object in a designated storage area.

As indicated at a Block OC25, the object implementation 44 requests the object broker 22 to create an object reference for the newly-created object and passes the object's storage 42 location to the object broker. The object broker 22 stores the newly created object's location in the location repository (Block OC26), the object broker 22 passes the object reference back to the object implementation 44 (Block OC27), and the location repository information is cached inside the object reference. As indicated at a Block OC28, the object implementation 44 completes processing and returns the results back to the object broker 22.

Finally, as represented by a Block OC29, the object broker 22 passes the object reference of the newly-created object back to the client application 30.

Object Activation

Figure 6A:
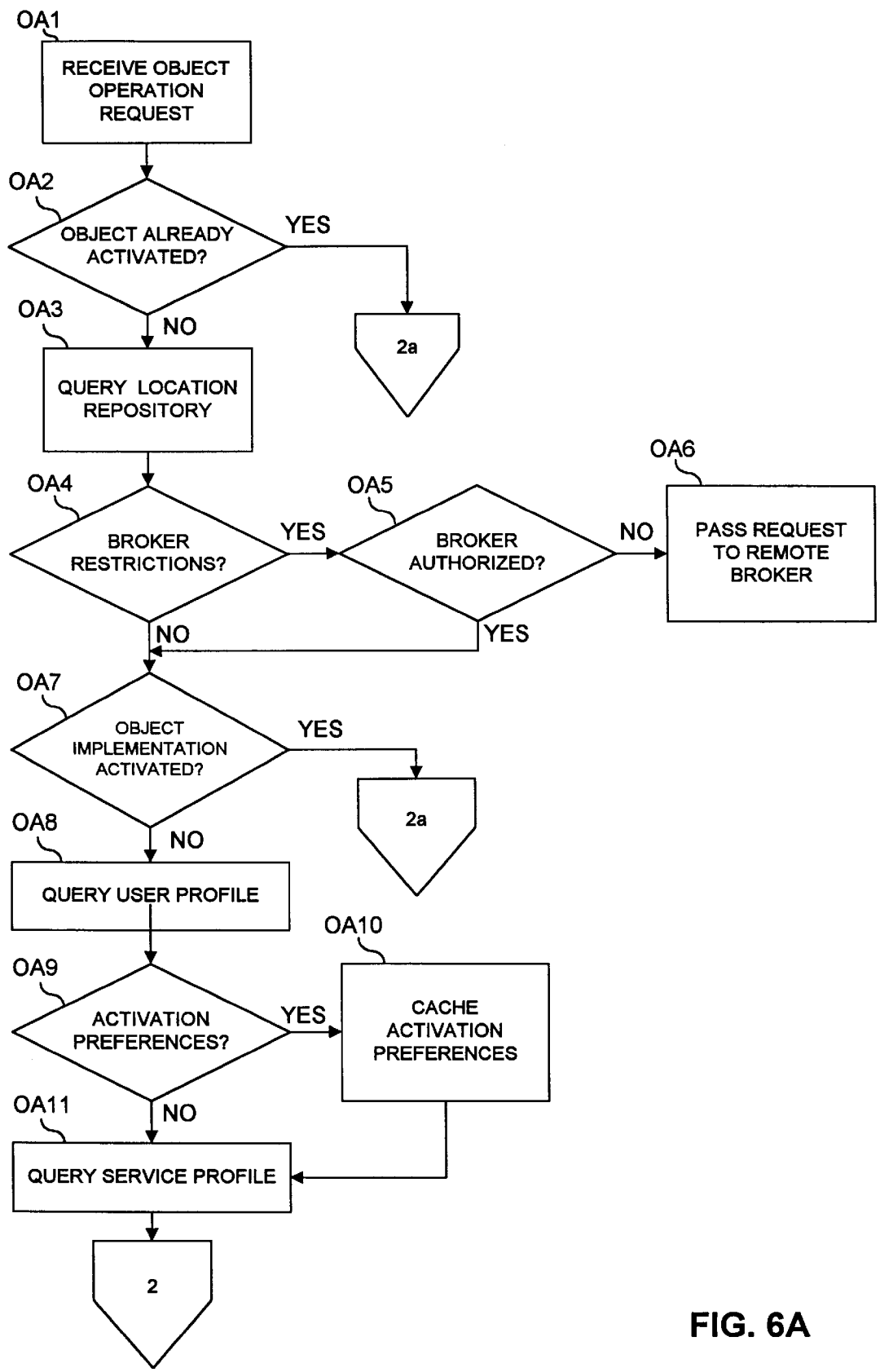
FIGS. 6A, 6B and 6C together constitute a flowchart illustrating a sequence of steps performed in activating an object in accordance with the teachings of the invention.
Figure 6B:
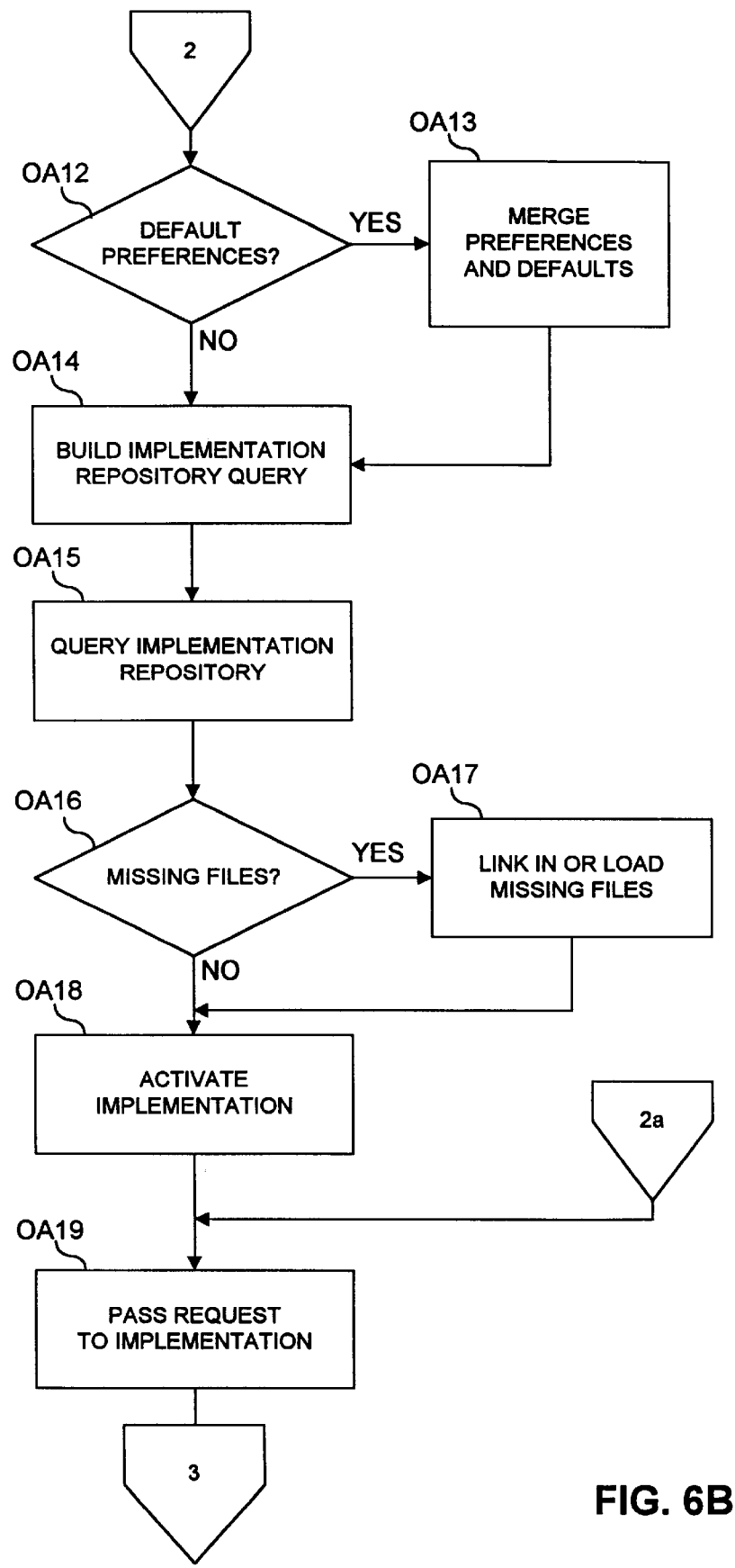
Figure 6C:
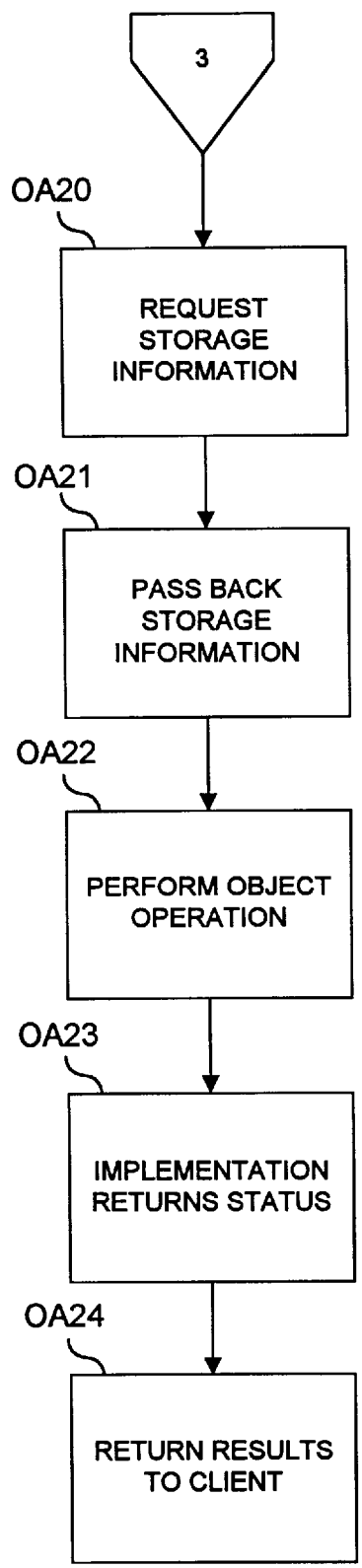

As shown above, the object creation operation leaves the client application 30 with an object reference to the newly-created object, enabling the client application to initiate that object's operations. The initiation process begins with the client application 30 sending an object operation request to its object broker 22–22n. The object broker 22 then uses the information in the user profile, the service profile and the implementation repositories to retrieve and start the object implementation. These object activation ("OA") steps are illustrated in FIGS. 6A, 6B and 6C, hereinafter referred to collectively as FIG. 6, and will be discussed in detail below.

Referring to FIG. 6, as represented by a Block OA1 the client application initiates a request to perform an object operation by sending an object operation request message to the object broker. This message contains an object reference, which identifies the particular type of object to be invoked, and any required parameters or other information required to perform the desired object operation.

The object broker 22 next determines (Block OA2) whether this object's implementation is already activated. An object's implementation may already be activated if a previous operation was performed on the object and the implementation has not yet ended. If the object implementation 44 is already activated, the object broker 22 passes the object operation request directly to the implementation in order to perform the operation.

If the object's implementation 44 was not already activated, the object broker 22 must determine where the object is located. As represented by a Block OA3, this is accomplished by looking for an entry in a location repository 24–24n that corresponds to the object reference information passed to the object broker 22 by the client application. The location entry identifier and the address of the location repository 24–24n are contained in this object reference information. As stated above in discussing the location repositories 24–24n, a client application references an object's location using location entry information, as depicted in TABLE 1. Thus, at this step, the object broker 22 retrieves the appropriate location entry from the specified location repository.

As described at a Block OA4, the entry identified in TABLE 1 as the Object Broker Restriction Flag may indicate that only specific object brokers can handle object operation requests for the specified object type. If the flag indicates there are object broker restrictions, the original object broker 22 cannot handle a request unless it is one of the object brokers listed in the accessor Object Broker entries of the location repository (TABLE 1) for the particular object. This decision is made at a Block OA5. If the original object broker 22 cannot handle the request, the object broker 22 passes this request to another object broker at a Block OA6, whereupon the object activation procedure is performed by the other object broker.

If the original object broker 22 is able to handle the object operation request, the object broker determines whether the object implementation 44 for this object type is already activated (Block OA7). If the object implementation 44 is already activated and can service multiple objects, the object broker 22 passes the object operation request directly to the object implementation 44 in order to perform the operation. If the implementation is not activated or cannot service multiple objects, the object broker 22 retrieves any user preferences from the user profile repository 34, indicated at Blocks OA8–OA10. After the user preferences are obtained, the object broker 22 accesses the service profile repository 38 to retrieve any default preferences that apply to this user–s particular service area, as indicated at Blocks OA11–OA12. These preferences are then merged at a Block OA13 and, if the preferences from the user profile repository 34 conflict with those obtained from the service profile repository 38, the user preferences are used.

At this point in the object activation process, the object broker 22 has assimilated the preferences and other parameters needed for the object operation and has the location of the desired object. Now the object broker 22 must retrieve the actual executables that will perform the desired operation. As depicted at a Block OA14, the object broker 22 builds the query to retrieve the executable information from the implementation repository 36–36n.

After the object broker 22 retrieves the storage 42 or other storage reference location of the appropriate executable and library information from the implementation repository 36, as illustrated at a Block OA15, the object broker 22 then retrieves and loads the executable and library information to the extent required (Blocks OA16 and OA17). The object broker 22 then activates the object implementation 44 and passes the object operation request to the object implementation 44, as represented by a Block OA18 and a Block OA19. As represented by a Block OA20, the object implementation 44 requests the object's storage information from the location repository 24. This storage information consists of the locations, in the form of storage 42 entries, for example, of the data associated with this object. This information is stored in the Data Storage Locations of the location entry that was created in the location repository 24 (TABLE 1) by the object creation operation for this object as discussed earlier.

As depicted by a Block OA21, the location repository 24 passes this storage information back to the object implementation 44 whereupon the object implementation 44 performs the desired object operation (Block OA22). Finally, as represented by a Block OA23, the implementation passes the results of the object operation back to the object broker 22, whereupon the object broker passes these results back to the client application 30 (Block OA24).

Although the Blocks OA4–OA19 of FIG. 6 are described more generally than the Blocks OC9–OC24 of FIG. 5, the underlying procedure is the same. Accordingly, reference should be had to the description of FIG. 5 for additional details.

Object Deletion

Figure 7A:
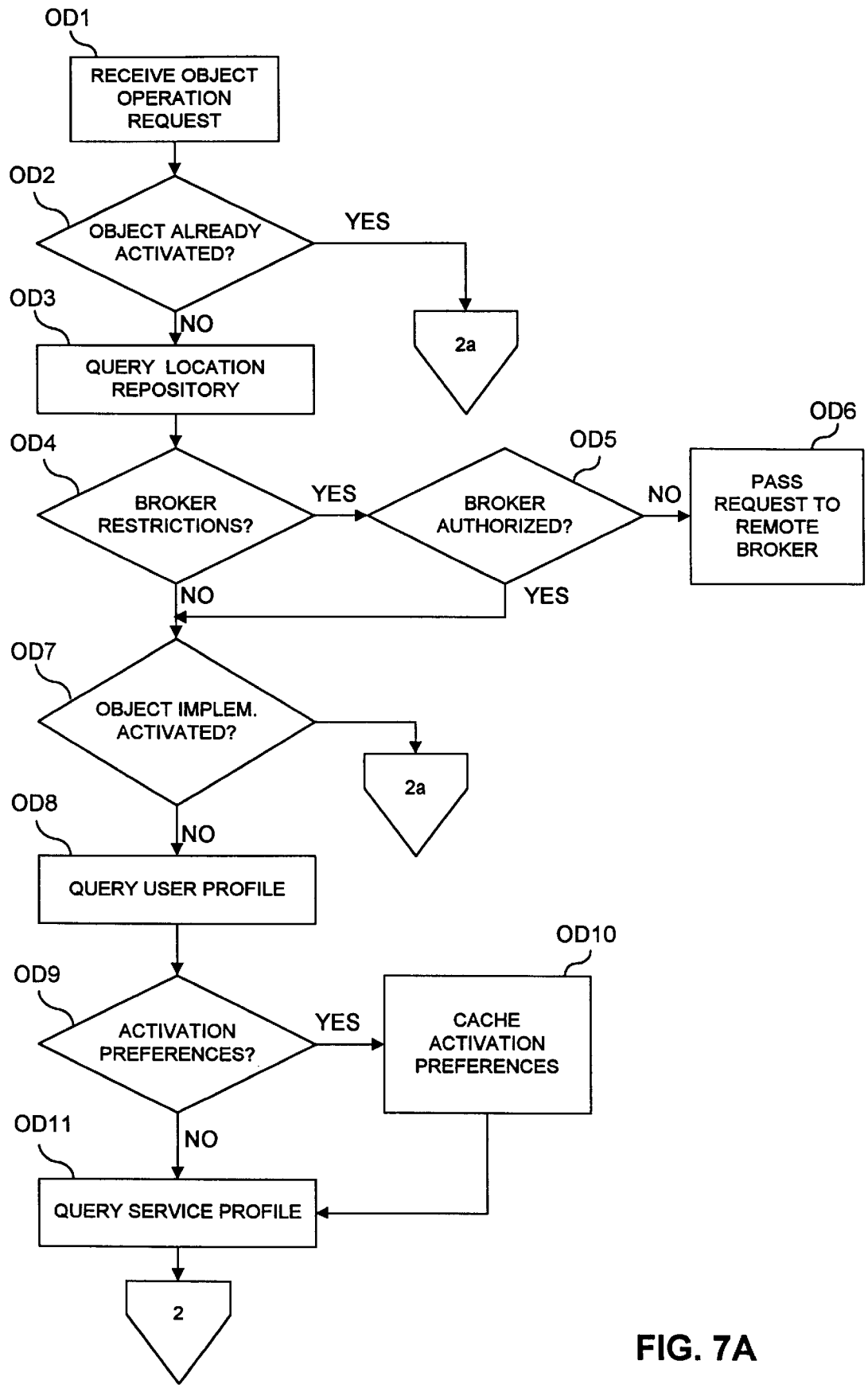
FIGS. 7A, 7B and 7C together constitute a flowchart illustrating a sequence of steps performed in deleting an instance of an object in accordance with the teachings of the invention.
Figure 7B:
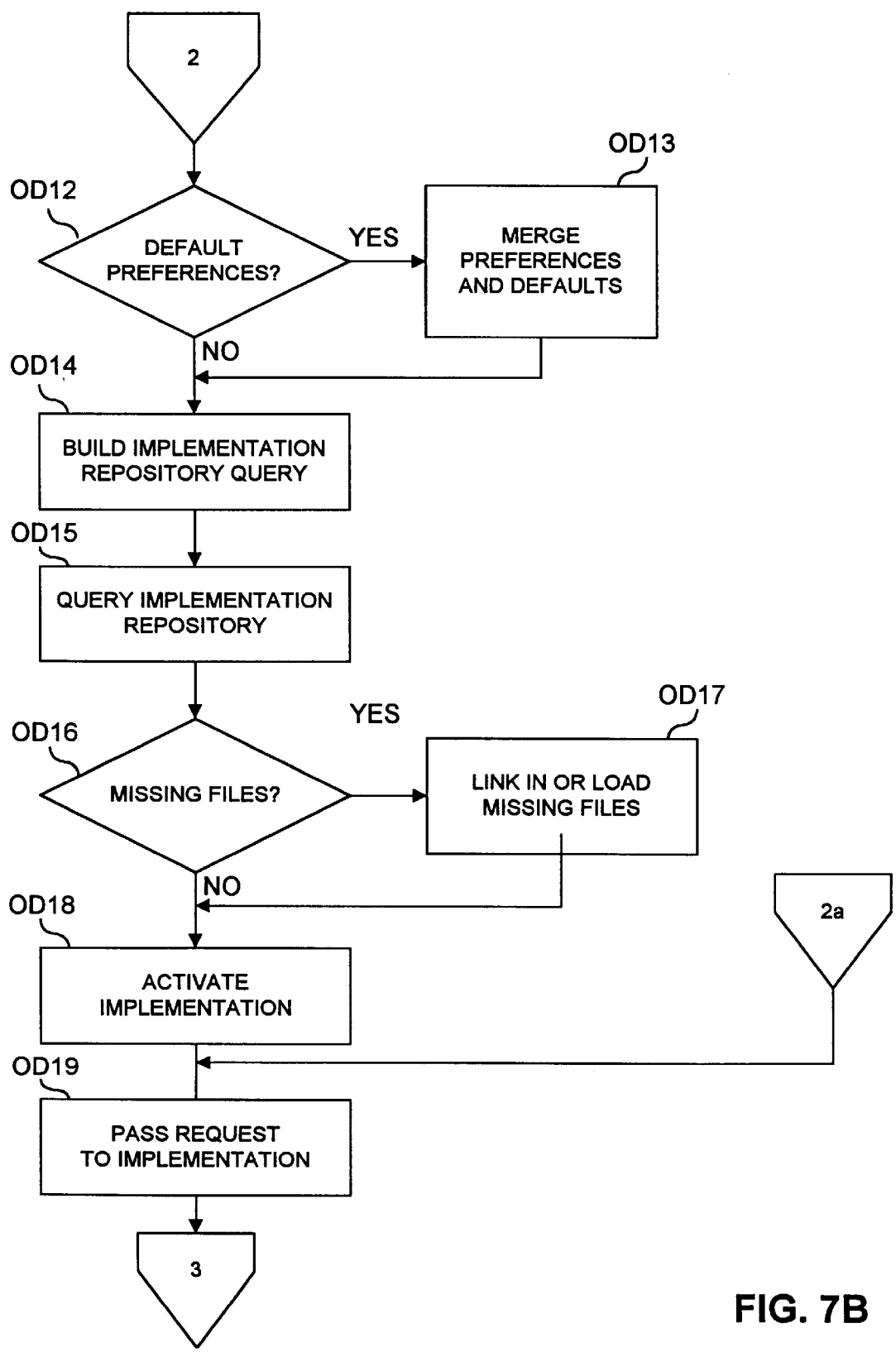
Figure 7C:
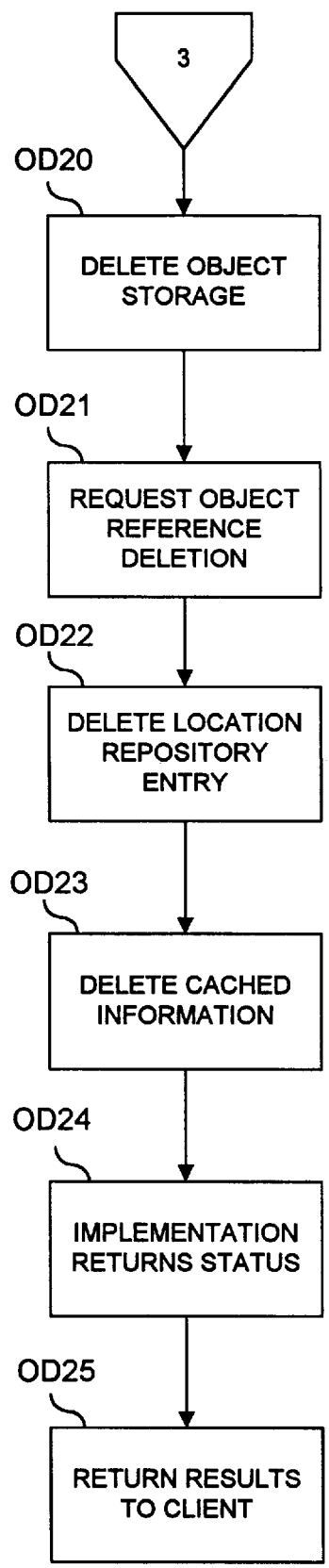

Once a user no longer needs to use a particular instance of an object, the object is ordinarily deleted. FIGS. 7A, 7B, and 7C, hereinafter referred to collectively as FIG. 7, describe the steps in an object deletion ("OD") operation. As FIG. 7 shows, the object deletion operations described by Blocks OD1–OD19 are the same as the corresponding steps of a typical object activation operation, as described in conjunction with FIG. 6. However, several additional steps are performed in the object deletion operation, commencing with a Block OD19.

As depicted at the Block OD20 of FIG. 7, the object implementation 44 deletes the storage of the object being deleted. Then, as represented by Blocks OD21–OD23, the object implementation 44 requests the object broker 22 to delete the object reference for the object whereupon the object broker deletes the storage location entry for the object in its location repository 24–24n and deletes any cached information for the particular instance of the object.

The object implementation 44 then completes processing and returns any status back to the object broker 22, as represented by a Block OD24, and the object broker passes the results of the object deletion operation back to the client application 30 (Block OD25). This ends the lifecycle of the particular instance of the object.

Repository Hierarchy

As illustrated in FIG. 3, an object-oriented environment 20 constructed according to the illustrated embodiment of the invention contains a plurality of repositories arranged in hierarchical fashion. For purposes of illustration, each level in the hierarchy of FIG. 3 is assigned a designation, such as "2H" or "2A,3A,4A" in order to identify that level in the hierarchy.

As shown in FIG. 3, a typical hierarchy of repositories resembles an inverted tree in that, as the hierarchy is traversed from top to bottom, repositories branch out from the repositories at the higher levels. In addition, the designations assigned to the repositories in FIG. 3 reflect the tree-like relationship between them. The repositories designated 2A through 2Z branch out from the Level 1 repository. In turn, the levels 2A through 2Z repositories have a plurality of repositories branching out from them. The repositories immediately below the 2A repository are designated 2A,3A through 2A,3Z, while the Level 3 repositories below the 2H repository are designated 2H,3A through 2H,3Z. Thus, the repository designations distinguish the repositories that branch out from the 2A repository from the other repositories that branch out from the Level 2B through 2Z repositories. In FIG. 3, the repository designations do not refer to Level 1 because there is only one master repository at Level 1 and, consequently, it is understood that all repositories are under the Level 1 repository.

The theoretical size of the repository hierarchy is unlimited and the shape of the hierarchy is determined by system needs. For example, some repository hierarchies are wide and have a small number of levels while other repository hierarchies are narrow but contain a large number of levels.

Depending on system resource needs, any repositories in the present invention, including the user profile repository, the service profile repository, the implementation repository and the interface repository, can be organized in this hierarchical structure.

Each repository in the hierarchy of FIG. 3 can be duplicated in order to improve system performance. Thus, each level in the hierarchy can have a master repository and a plurality of other repositories, called "peer replication repositories", that contain the same information as the master. A repository is typically duplicated when the information in the repository is in high demand and additional repositories are needed to increase the speed with which the desired information can be retrieved by users.

System Profile Repository

To provide access to information in repositories throughout the hierarchy, a typical embodiment of the present invention provides another type of repository, called a system profile repository (not shown), at each level in the hierarchy. For example, referring to FIG. 3, a system profile repository would reside at Level 2H, at Level 2A,3A, at Level 2H,3Z,4A, and so forth.

TABLE 5 illustrates a typical embodiment of a system profile repository which contains a Local Name and a number of Entry Names. The Local Name is a descriptive name of the level in the hierarchy where the particular service profile repository resides. Each Entry Name contains information corresponding to a particular level in the repository hierarchy. This information includes addresses and other information needed to access other repositories in the hierarchy. The Parent Level Name and Child Level Names shown in TABLE 5 are descriptive names for the parent level above and the child levels below a particular entry's level in the hierarchy.

TABLE 5

System Profile Repository

Local Name
Entry Name #1:
    Parent Level Name
    Parent System Profile Repository
    Parent Security Information
    Peer Master System Profile Repository
    Peer Replication System Profile Repositories:
        Peer Replication System Profile Repository #1
        .
        .
        Peer Replication System Profile Repository #n
    Peer Security Information
    Child Level Names
    Child System Profile Repositories:
        Child System Profile Repository #1
        .
        .
        Child System Profile Repository #n
    Child Security Information
    Implementation, Interface, and Service Repository
    Configuration:

TABLE 5-continued

System Profile Repository

Parent Repository
Master Peer Repository
Peer Replication Repositories:
    Peer Replication Repository #1:
        Address Information
        Child Master Repositories:
            Child Master Repository #1
            .
            .
            Child Master Repository #n
    Peer Replication Repository #2:
    .
    .
    Peer Replication Repository #n:
Entry Name #2:
.
.
.
Entry Name #n:

The Parent, Peer Master, Peer Replication, and Child System Profile Repositories listed in TABLE 5 contain the addresses of the system profile repositories located immediately above, at the same level, and immediately below this entry's level in the hierarchy. For example, referring again to FIG. 3, in the entry name for the 2H repository, the Parent System Profile Repository entry contains the address of the system profile repository that is located at the level in the hierarchy above the 2H repository, namely, the Level 1 system profile repository. The Peer Master System Profile Repository contains the address of the master system profile repository located at this entry's level in the hierarchy, namely, the Master System Profile Repository for the 2H level in the repository. The Peer Replication System Profile Repositories contain the addresses of the Peer Replication System Profile Repositories that are located at this entry's level in the hierarchy, namely, the Peer System Profile Repositories for the 2H level in the repository. Finally, the Child System Profile Repository provides the addresses of the Master System Profile Repositories at the next level in the hierarchy immediately below the 2H repository, namely, the Master System Profile Repositories for the 2H,3A through 2H,3Z levels in the repository. For each of these system profile repository entries, more than one server address can be specified for each repository. Thus, more than one path can be provided to access the information in the neighboring system profile repositories.

The Parent, Peer, and Child Security information of TABLE 5 provides the public encryption and decryption keys required to access the corresponding repositories in the hierarchy. There is one entry per server.

The Service, Implementation, and Interface Repository Configuration entries contain address information that is used to access the parent, peer, and child levels of the service profile, implementation, and interface repositories, respectively. Using the implementation repository configuration as an example and referring to TABLE 5, address information is provided for the Parent Implementation Repository, the Master Peer Implementation Repository, the Peer Replication Implementation Repositories, and the Child Master Implementation Repositories.

Locating a Repository

Figure 9A:
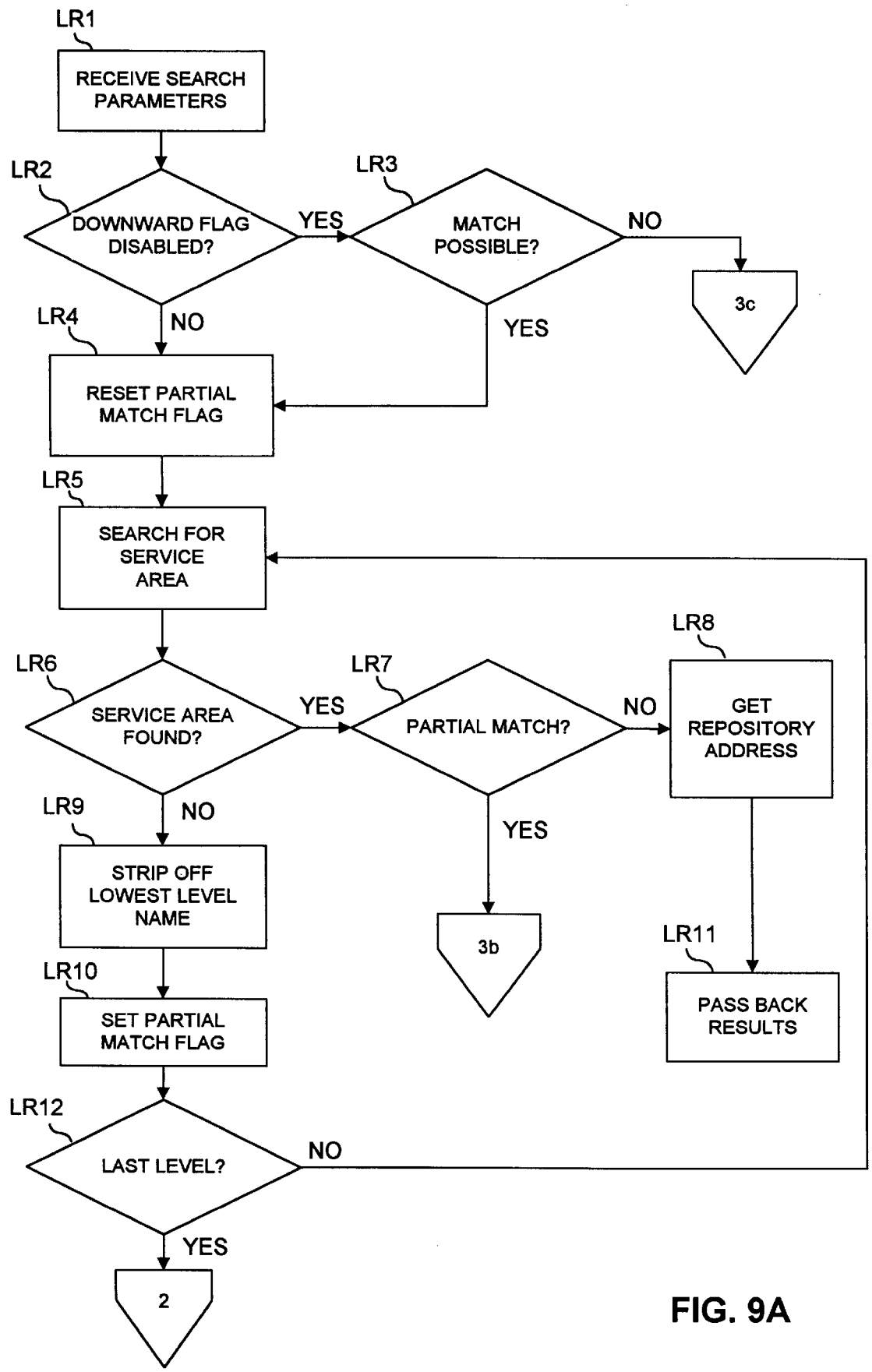
FIGS. 9A, 9B and 9C together constitute a flowchart illustrating a sequence of steps performed in locating a repository in accordance with the teachings of the invention.
Figure 9B:
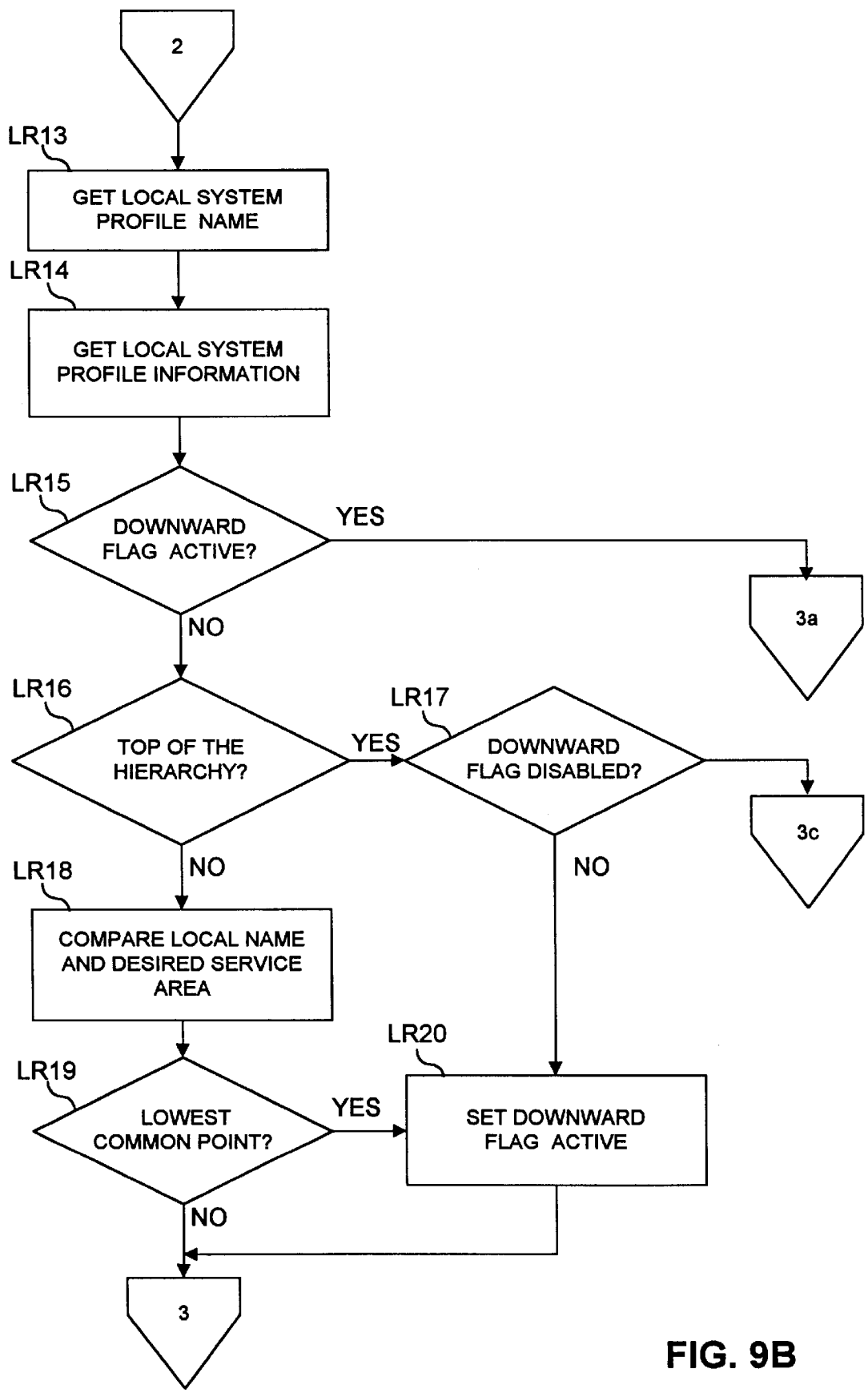
Figure 9C:
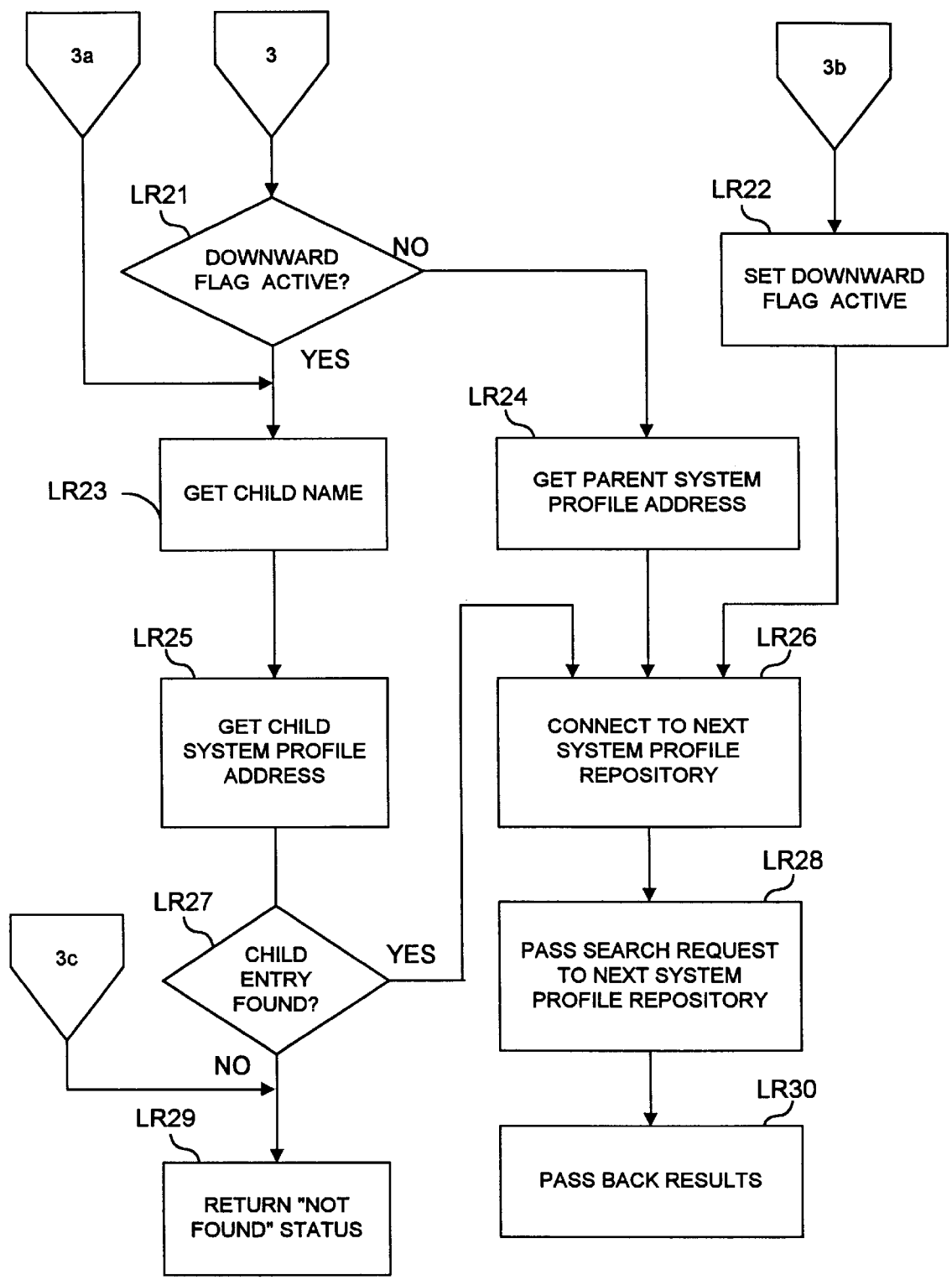

When a system component requires information contained in a repository in a different part of a hierarchy, information in the system profile repositories is used to retrieve the information in the remote hierarchy. Under these circumstances, a repository search is typically initiated by an object broker 22 or an implementation that requires the information in a particular repository, or by a repository passing a search request to another repository. In order to retrieve the contents of a repository, the address of the repository must be obtained. As discussed above with regard to FIG. 8, if the address of the repository was not cached at a previous time by the system, the locate repository routine ("LR") described by FIGS. 9A, 9B and 9C, hereinafter referred to collectively as FIG. 9, is used.

The search is conducted by looking for a system profile repository (not shown) that contains, as shown in TABLE 5, an entry name for the service area in which the repository containing the desired information resides. The entry name for the particular service area will contain the address of the desired repository.

For these purposes, a service area is the name used to identify a particular level in a hierarchy. For example, referring to FIG. 3, the service area of the 2H,3Z,4A,5A repository can be designated as /2H/3Z/4A. Here, the "/" symbols merely separate the hierarchy levels. The /2H/3Z/4A designation indicates that the 2H,3Z,4A,5A repository can be found under this level in the hierarchy.

Referring now to FIG. 9, the parameters used at a Block LR1 of the locate repository routine include the service area of the desired repository, the type of the desired repository, the address of the system profile repository of the service area where the search was initiated, and a search control flag that determines how the hierarchy is to be searched.

As represented by a Block LR2, if the downward flag is set to disabled, the search for the repository cannot be passed down the hierarchy. As represented by a Block LR3, if the desired service area is not equal to or above the local service area (the service area where the search is being conducted), it will not be possible to find a match for this service area without doing a downward search. As a result, the search will return a status indicating that the repository could not be found.

At a Block LR4, the partial match flag is reset. This flag is used to indicate whether an entry found in a system profile repository is an entry for the desired service area or an entry for a service area above the desired service area. The desired service area is compared at a Block LR5 with the entry names in the system profile repository at the level in the hierarchy where the search is initiated. As represented by a Block LR6 and a Block LR7, if an entry for the desired service area is found, the locate repository routine checks the partial match flag. If the partial match is not set, the routine has found an entry for the desired service area. The routine then gets the address of the desired repository from the system profile repository (Block LR8) and the locate repository routine passes this address back to the routine that requested the search (Block LR11). If the partial match flag is set, the routine has found an entry for a service area above the desired service area. That entry is searched to get the address of its service area's system profile repository. Then, the downward flag is set to active (Block LR22) and, as illustrated at a Block LR26, a connection is made to that repository. As represented by a Block LR28, the locate repository request is then passed to that service profile repository 38, whereupon the process outlined here is repeated using that service profile repository.

If a matching entry is not found at a Block LR6, the locate repository routine compares the desired service area with the entry names in the system profile repository to determine whether the repository contains an entry name for a service area above the desired service area. This is done, as depicted in a Block LR9, by stripping off the lowest level designation of the desired service area. For example, if the desired service area was /2H/3Z/4A, the system profile repository would be searched for an entry name that corresponded to the /2H/3Z service area. Similarly, if there was no /2H/3Z entry, on the next pass through the loop defined by the Blocks LR5, LR6, LR9, LR10, and LR12, the system profile repository would be searched for an entry name corresponding to the /2A service area. This would continue up to the / service area which represents the top of the hierarchy, Level 1 in FIG. 3.

The partial match flag is set, as illustrated in a Block LR10, when the lowest level designation is first stripped off the desired service area name. This indicates that the only entries that might be found in this system profile repository are for service areas above the desired service area.

Next, the locate repository routine must determine whether the last hierarchy level in the current system profile repository has been searched. In other words, the routine determines whether the system profile repository currently being searched should be searched for any other service area entries. There are two ways to determine whether the search in this repository should end. First, the search for a matching entry above the desired service area ends when the search reaches the top of the hierarchy. This would occur, for example, when the search name is truncated from "/" to "" at the Block LR9. Second, the search of the current system profile repository ends when the search name is equal to the name of the current system profile. This prevents the search from inadvertently being passed up the hierarchy when the search is to be passed down the hierarchy.

As represented at the Block LR12, if the last hierarchy level in the current system profile repository has not been searched, the routine continues back to the Block LR3 where the process of stripping off the lower levels of the desired service area is continued. If the last hierarchy level in the current system profile repository has been searched, the search of this particular system profile repository can go no further. The search then must be passed to a system profile repository in another part of the hierarchy. This takes place at a Block LR13, where the Local Name in the system profile repository (see TABLE 5) is retrieved and, as depicted at a Block LR14, the entry information that corresponds to the service area for the local name is then retrieved from the current system profile repository.

The downward flag is examined at a Block LR15. If it is active, this means that the search is being passed down the hierarchy, causing the routine to pass to a Block LR23 to extract the appropriate child level name from the desired service area. If the downward flag is not active, however, the search is being passed up the hierarchy. Thus, the routine must check to see whether the top of the hierarchy has been reached. If the top of the hierarchy has been reached, the search must be turned downward. However, as represented by a Block LR17, if downward searches are not allowed a not found status will be returned. If downward searches are allowed, the downward flag is set to "active", indicating that the search is to be passed down the hierarchy. This is depicted at a Block LR20 of FIG. 9.

As indicated at a Block LR18, if the top of the hierarchy has not been reached, the locate repository routine compares the current service area with the desired service area. The routine then checks at a Block LR19 to see whether the search has reached a service area above the desired service area in the hierarchy. If it has, the search must be turned downward since the desired service area is below the current level in the hierarchy. For example, referring to FIG. 3, if the desired service area was /2H/3Z/4A and the current service area for the search was /2H or /2H/3Z, the lowest common level has been reached and the search must turn downward from the current service area in order to find service area /2H/3Z/4A. The routine then passes to the Block LR20 and sets the downward flag to active.

As represented by a Block LR21, if the downward flag is not active, the search is being passed up the hierarchy to the system profile repository that resides at the service area immediately above the current service area. The address of that repository is then found in the current service area's system profile repository under the parent system profile repository entry (Block LR24). The search is passed to that repository, as indicated at the Blocks LR26 and LR28, discussed above, where the process is repeated using the new service profile repository.

If the downward flag is active at the Block LR21, the search is going down the hierarchy and the search must be passed to the system profile repository at the next lower level. The proper lower level repository is found using the desired service area. For example, if the desired service area was /2H/3Z/4A and the current service area for the search was /2H, the search needs to be passed to the system profile repository that is immediately below the 2H repository and that is above the desired service area. In this case, the proper service area is /2H/3Z. As indicated at the Block LR23, the name of the child level is extracted from the desired service area. In the example above, the child level name to be searched for in the /2H service area is /3Z. The address of the /2H/3Z repository is then found at the Block LR25 in one of the child system profile repository entries in the /2H service area's system profile repository. If the desired child entry is not found, the search returns a status indicating that the desired repository was not found (Blocks LR27 and LR29). If the child entry was found, the locate repository routine then connects to the system profile repository at Block LR26.

The locate repository request is passed to that service profile repository, as illustrated at the Block LR28, whereupon the process outlined above is repeated using the information in that service profile repository. Once the desired repository is found, the address of the repository is passed back to this routine and back to the routine that initiated the search, as indicated at a Block LR30.

Repository Replication

In addition to providing a way to distribute information anywhere in the repository hierarchy, a typical embodiment of the present invention also provides a mechanism for copying information throughout the repository hierarchy, as needed. If certain information is frequently used in a particular area of the hierarchy, it may be desirable to move the information into that area. By using information in the system profile repository embodying the addresses of the parent, peer, and child repositories, replication of the information in the repositories can be performed automatically or on-demand.

Automatic replication is typically performed by the repositories themselves. As new information is added to a repository or as existing information is upgraded, the repository looks up the addresses of the repositories at the peer and next lower levels of the hierarchy and automatically replicate the information into those repositories. The repositories receiving the information then perform the same replication process until all appropriate repositories in the hierarchy below the first one contain the desired information.

On-demand replication is typically used when information is only needed in a certain area of the hierarchy. For example, if a repository does not contain the information it requires, it will search up the hierarchy for the desired information and, once found, the information would be replicated to the repositories in the hierarchy down to the requesting repository. In this case, duplication is typically made only in the chain of repositories that leads from the requesting repository to the repository containing the information. Thus, on-demand replication disseminates information only as required, thereby reducing the amount of storage used in the system.

Automatic Replication

Figure 10A:
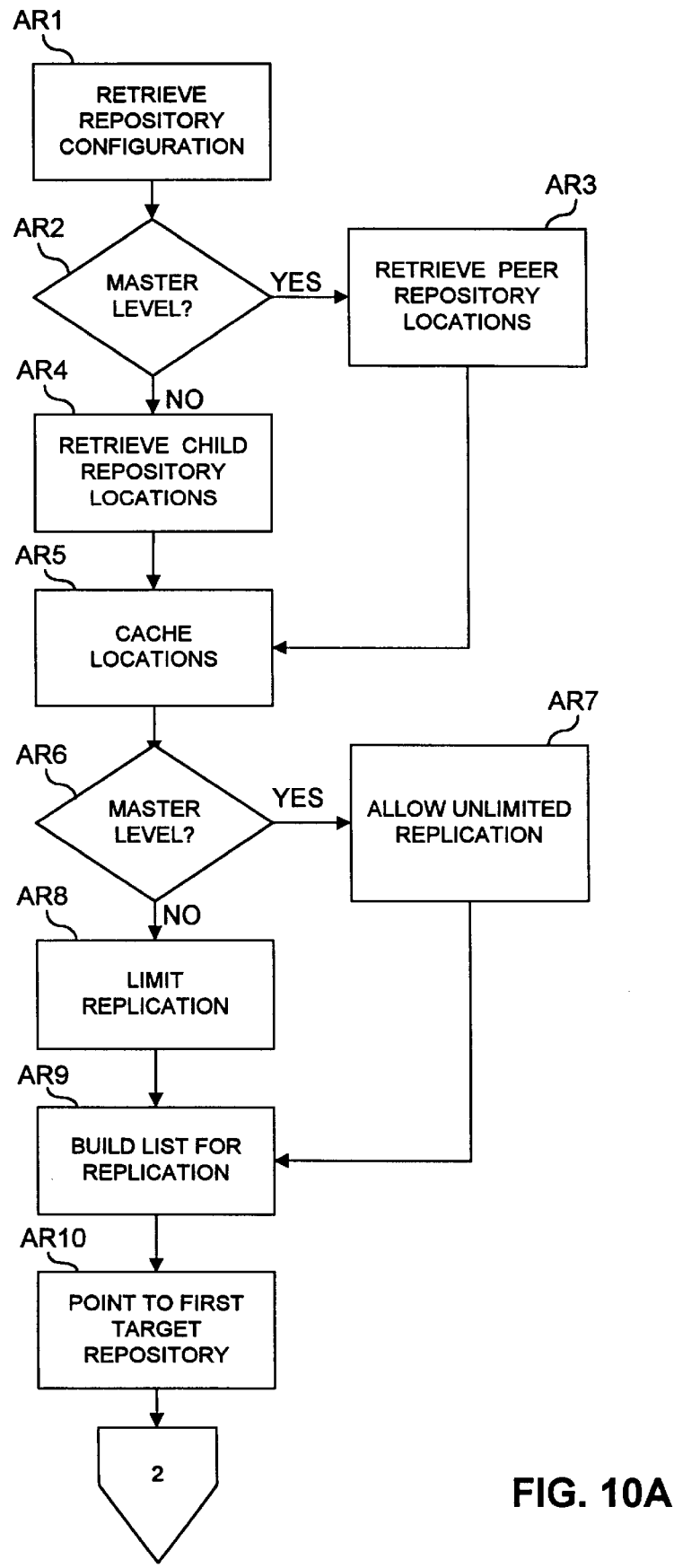
FIGS. 10A and 10B together constitute a flowchart illustrating a sequence of steps performed in replicating the contents of a repository in accordance with the teachings of the invention.
Figure 10B:
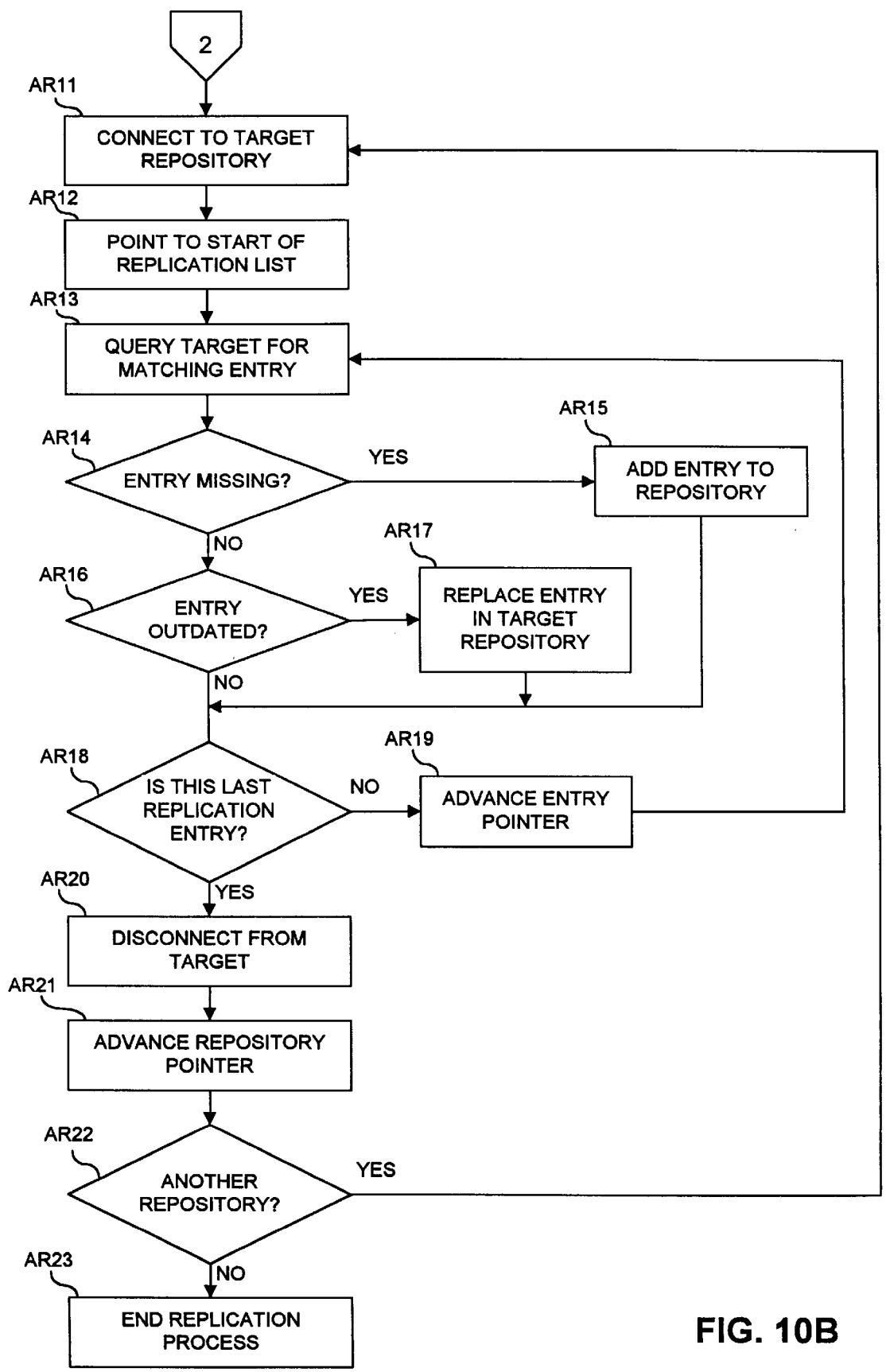

Automatic repository replication is typically performed periodically as a part of repository maintenance. FIG. 10A and 10B, hereinafter referred to collectively as FIG. 10, illustrate how information in the service profile, implementation, and interface repositories are replicated automatically throughout the hierarchy. The repository performing the replication first retrieves its repository configuration information from the system profile repository. The repository then checks its configuration information to determine whether it is the master of the current service area. If the repository is the master, the information in the repository is replicated to all peer repositories in that service area. If the repository is not the master, the information is replicated to that repository's child master repositories that are set for DEEP replication, or that are set for SHALLOW and NON-REPLICATED replication. The automatic replication ("AR") operation is discussed in more detail below.

Referring now to FIG. 10, the replication process is begun by a repository accessing its system profile repository to retrieve its repository configuration information, as depicted at a Block AR1. For example, if an implementation repository 36 (FIG. 2) is being replicated, the Implementation Repository Configuration of TABLE 5 would be retrieved. Similarly, if a service profile repository 38 is being replicated, the Service Repository Configuration would be retrieved. As discussed above, these repository configurations contain the addresses for the parent repository, the master peer repository, the peer replication repositories, and the child master repositories for the current service area.

The repository compares its address with the master peer repository address to determine whether it is a master (Block AR2). If so, the flow proceeds to a Block AR3 and retrieves the addresses of all the peer replication repositories. If the repository is not the master of this service area, the repository retrieves the addresses of the child master repositories, as indicated at a Block AR4. This address information is stored for future use at a Block AR5.

As indicated at a Block AR6, the repository again compares its address with the master peer repository. If the repository is the master, the information in the master repository is copied to the peer replication repositories at a Block AR7. If the repository is not the master, the replication control information for all the entries in the repository (TABLES 2 and 4) is retrieved at a Block AR8. If the replication control for an entry is set to DEEP, that entry will be replicated to all child master repositories. If the replication control for an entry is set to SHALLOW, only those entries whose replication control is also set to NON-REPLICATED will be replicated to the child master repositories. Those entries whose replication control is set to SHALLOW and REPLICATED are replicated only using the on-demand replication procedure described below.

As indicated at a Block AR9, a list of all entries to be replicated is then created. The repository gets the address of the first repository to be updated from the list generated in the Block AR5, as indicated at a Block AR10.

A loop is entered at Blocks AR11–AR22 wherein the entries on the list generated in the Block AR9 is sequentially replicated to the target repositories specified at the Block AR5. This loop is begun at a Block AR11 by the repository making a connection to the target repository. Then, as indicated at a Block AR12, the repository gets the first entry on the list.

The repository queries the target repository at a Block AR13 to see if the target repository already contains this entry and adds the information, as described by a Block AR14 and a Block AR15, if it does not. If the target repository does contain the entry, the repository checks the last update time information, shown in TABLES 2 and 4, for that entry in the target repository. If the last update time in the target repository is earlier than the last update time of the entry being copied (which is determined by the last update time in the repository doing the replicating), the information in the target repository is replaced, as described by a Block AR17.

If the information replicated is not the last entry on the list, the repository gets the next entry, as shown at a Block AR18 and a Block AR19, and the program flow returns to the Block AR13. If the last entry has been replicated, the repository disconnects from the target repository, as indicated at a Block AR20, and gets the address of the next repository to be updated, as shown at a Block AR21.

As represented by a Block AR22, the process goes back to the Block AR11 if there are more repositories to be updated. If there are no more repositories to be updated, the replication process is done (Block AR23).

On-demand Replication

Figure 11:
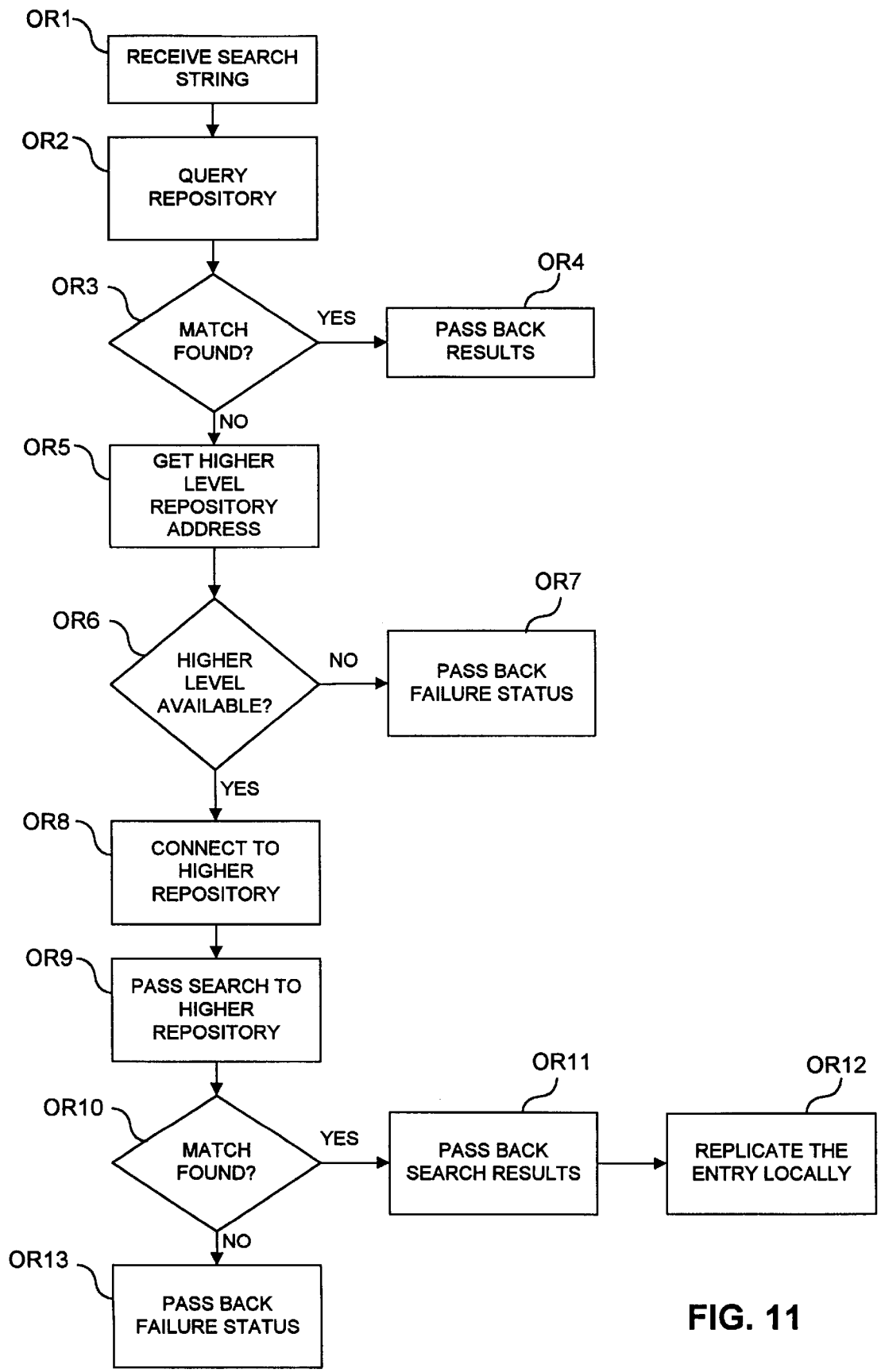
FIG. 11 is a flowchart illustrating a sequence of steps performed in replicating the contents of a repository on-demand in accordance with the teachings of the invention.

In a typical embodiment of the present invention, on-demand repository replication occurs when a repository queried for information does not contain the requested information. FIG. 11 describes how information in the service profile, implementation, and interface repositories gets replicated in the hierarchy on an on-demand basis. This process typically starts with an external query from an object broker 22–22n, another repository, administration tool 32 or object implementation 44 for information related to a particular object type. If, a match is not found after the repository compares the search parameters of the requested object information with the object information in the repository, the repository accesses its parent and passes the search up to that repository. If the parent contains the desired object information, it passes the information back to the first repository. If the parent repository does not contain the desired object information, it passes the search request up to its parent. Thus, the search continues up the hierarchy until either the object type information is found or the top of the hierarchy is reached. The on-demand replication ("OR") operation is discussed in more detail below.

Referring now to FIG. 11, using the implementation repository as an example, as indicated at a Block OR1, the implementation repository is queried using the following parameters: object type, implementation preference, hardware platform, network protocol, and object broker vendor. The implementation repository is then queried at a Block OR2. As shown in TABLE 4, the Object Type Parameter identifies the module and particular object type to be accessed. The remaining parameters are compared with that the object type search parameters for the particular object type. If a match is found, the Object Type Implementation Information of TABLE 4 is passed back to the requesting application, as indicated at a Block OR3 and a Block OR4. If a match is not found, the repository accesses the system profile repository illustrated in TABLE 5 and retrieves the repository configuration to get the parent repository address (Block OR5).

As indicated at a Block OR6 and a Block OR7, if there is no parent repository in the hierarchy, an error message is returned to the requesting application. If there is a parent repository, a connection is made to that repository at a Block OR8. Depending on how the repositories are implemented, this connection can be made by connecting to a server for that repository, by accessing a distributed database that serves as the repository, or by any other appropriate method.

As indicated at a Block OR9, a search request including the parameters received at the Block OR1 are sent to the parent repository. If the search at the higher levels of the hierarchy is successful, the search results are passed back to the repository that started the search (Block OR10). This repository, in turn, passes the search results back to the requesting application (Block OR11). As indicated at a Block OR12, the search results are then replicated into the current repository, thereby completing the replication process. It will be understood, however, that a failure status will be returned to the requesting application if the object type information is not found at any of the higher levels of the hierarchy.

Example

With the foregoing description of the components and operation of one embodiment of the present invention in mind, a specific example of an object operation sequence will be given to illustrate how the object broker 22 uses information in its repositories to manage system resources in the performance of object operations and control the manner in which object operations are performed.

The example involves a person named George Smith who sends a video mail message to John Doe using a system based on a typical embodiment of the present invention. George lives in Orlando, Fla. and John lives in Seattle, Wash.

George uses his multi-media computer in Orlando to access a computer program that creates and sends video mail messages. George's computer is a PowerPC running the MS-Windows_NT operating system and using an ATM network interface. The computer program is one of the objects managed by the system and has an object type name of "ACME::VIDEOMAIL."

John uses his multi-media computer in Seattle to access a computer program that allows him to view the video mail message from George. John's computer is a Sun Sparc machine running the Solaris 2.3 operating system and using an ATM network interface. The program accessed by John is the ACME::VIDEOMAIL object received from George.

Before George and John can access the video mail program, certain information about George, John, the computer program and the hierarchy of information repositories in the system must be stored in some of the information repositories. This information would typically be installed by a system administrator using the administration tools of the system or by some other known method.

The exemplary system uses a hierarchy of repositories organized according to geographical boundaries. The top level of the hierarchy encompasses the entire United States and is designated "USA." The next level of the hierarchy is divided along state lines. For example, "/USA/FLORIDA" and "/USA/WASHINGTON" are two service areas below the /USA service area. Likewise, the next level down in the hierarchy is divided using the names of cities. Thus, /USA/FLORIDA/ORLANDO and /USA/WASHINGTON/SEATTLE are two service areas below the /USA/FLORIDA and /USA/WASHINGTON service areas.

In order to identify individual users of the system, each user is identified by a service area and a unique user identification name. George's service area is /USA/FLORIDA/ORLANDO and John's service area is /USA/WASHINGTON/SEATTLE. In addition, George has been assigned a user identification of GEORGES1 and John has been assigned a user identification of JOHNDOE2.

Each service area in the hierarchy has a system profile repository that contains information used to access the other's repositories in the hierarchy. TABLE 6 shows the system profile repository information that is relevant for the purposes of this example.

TABLE 6

System Profile Repositories

/USA/FLORIDA service area:
    Local Name = /USA/FLORIDA
    Entry Name #1 = /USA/FLORIDA:
        Parent Level Name = /USA
        Parent System Prof. Repos. = USAServ2 SysProf
        Peer Master System Prof. Repos. = FLServ1 SysProf
        Peer Replication System Prof. Repos.:
            FLServ2 SysProf
        Child Level Names:
            Orlando
            Miami
        Child System Profile Repositories:
            Orlando OrlServ1 SysProf
            Miami MiaServ1 SysProf
        Implementation Repository Configuration:
            Parent Repository = USAServ2 ImpRep
            Master Peer Repository = FLServ1 ImpRep
            Peer Replication Repositories:
                FLServ2 ImpRep
                Child Master Repositories:
                      Orlando OrlServ2 ImpRep
                    Miami MiaServ3 ImpRep
        Service Repository Configuration:
            Parent Repository = USAServ2 SrvRep
            Master Peer Repository = FLServ1 SrvRep
            Peer Replication Repositories:
                FLServ2 SrvRep
                Child Master Repositories:
                      Orlando OrlServ2 SrvRep
                    Miami MiaServ3 SrvRep
        User Repository Configuration:
            Parent Repository = USAServ2 UserRep
            Master Peer Repository = FLServ1 UserRep
            Peer Replication Repositories:
                FLServ2 UserRep
    Entry Name #2 = /USA/WASHINGTON
        Parent Level Name = /USA
        Parent System Prof. Repos. = USAServ2 SysProf
        Peer Master System Prof. Repos. = WAServ1 SysProf
        Peer Replication System Profile Repository:
            WAServ2 SysProf
        Child Level Names:
            Seattle
            Walla Walla
        Child System Profile Repositories:
            Seattle SeaServ1 SysProf
            Walla Walla WalServ1 SysProf
        Implementation Repository Configuration:
            Parent Repository = USAServ2 ImpRep
            Master Peer Repository = WAServ1 ImpRep
            Peer Replication Repositories:
                WAServ2 ImpRep
                Child Master Repositories:
                      Seattle SeaServ2 ImpRep
                    Walla Walla WalServ3 ImpRep
        Service Repository Configuration:
            Parent Repository = USAServ2 SrvRep
            Master Peer Repository = WAServ1 SrvRep
            Peer Replication Repositories:
                WAServ2 SrvRep
                Child Master Repositories:
                      Seattle SeaServ2 SrvRep
                    Walla Walla WalServ3 SrvRep
        User Repository Configuration:

TABLE 6-continued

System Profile Repositories

```
                Parent Repository = USAServ2 UserRep
                Master Peer Repository = WAServ1 UserRep
                Peer Replication Repositories:
                    WAServ2 UserRep
/USA/WASHINGTON service area:
    Local Name = /USA/WASHINGTON
    Entry Name #1 = /USA/WASHINGTON:
        See Entry Name #2 in /USA/FLORIDA service area
above.
    Entry Name #2 = /USA/FLORIDA:
        See Entry Name #1 in /USA/FLORIDA service area
above.
/USA/FLORIDA/ORLANDO service area:
    Local Name = /USA/FLORIDA/ORLANDO
    Entry Name #1 = /USA/FLORIDA/ORLANDO:
        Parent Level Name = /USA/FLORIDA
        Parent System Profile Repository = FLServ2 SysProf
        Peer Master System Prof. Repos. = OrlServ1 SysProf
        Peer Replication System Profile Repository:
            OrlServ2 SysProf
        Implementation Repository Configuration:
            Parent Repository = FLServ2 ImpRep
            Master Peer Repository = OrlServ1 ImpRep
            Peer Replication Repositories:
                OrlServ2 ImpRep
        Service Repository Configuration:
            Parent Repository = FLServ2 SrvRep
            Master Peer Repository = OrlServ1 SrvRep
            Peer Replication Repositories:
                OrlServ2 SrvRep
        User Repository Configuration:
            Parent Repository = FLServ2 UserRep
            Master Peer Repository = OrlServ1 UserRep
            Peer Replication Repositories:
                OrlServ2 UserRep
/USA/WASHINGTON/SEATTLE service area:
    Local Name = /USA/WASHINGTON/SEATTLE
    Entry Name #1 = /USA/WASHINGTON/SEATTLE:
        Parent Level Name = /USA/WASHINGTON
        Parent System Profile Repository = WAServ2 SysProf
        Peer Master System Prof. Repos. = SeaServ1 SysProf
        Peer Replication System Profile Repository:
            SeaServ2 SysProf
        Implementation Repository Configuration:
            Parent Repository = WAServ2 ImpRep
            Master Peer Repository = SeaServ1 ImpRep
            Peer Replication Repositories:
                SeaServ2 ImpRep
        Service Repository Configuration:
            Parent Repository = WAServ2 SrvRep
            Master Peer Repository = SeaServ1 SrvRep
            Peer Replication Repositories:
                SeaServ2 SrvRep
        User Repository Configuration:
            Parent Repository = WAServ2 UserRep
            Master Peer Repository = SeaServ1 UserRep
            Peer Replication Repositories:
                SeaServ2 UserRep
```

Entry Name #2=/USA/WASHINGTON:

See Entry Name #2 in /USA/FLORIDA service area above.

Default implementation preferences are installed in the service profile repositories. As TABLE 7 shows, both the /USA/WASHINGTON and the /USA/FLORIDA/ORLANDO service areas contain an ACME::VIDEOMAIL object type entry. In this example, these object type entries had to be replicated to these repositories at some previous point in time because these object type entries would not have been automatically replicated throughout the hierarchy since the Replication Control is set to NORMAL.

TABLE 7

Service Profile Repositories

```
/USA/WASHINGTON service area:
    Object Type #1 = ACME::VIDEOMAIL
        Search Parameters:
            Object Type Name = ACME::VIDEOMAIL
            Object Type Version = 1
            Replication Control = NORMAL
        Object Resource Assignmentes:
            Object Storage Information:
                Server = WAServ20; Database = VMailAA
            Available Object Brokers = Any
            Location Entry Storage Information:
                Server = WALRServ6; Database = LocRep21
        Default Attribute Values:
            Creation Attributes:
                Compression_Type = MPEG
                Resolution = 300 dpi
            Activation Attributes:
                Zoom_Ratio = 150%
                Frames_Per_Second = 32
/USA/WASHINGTON/SEATTLE service area:
    (no entries)
/USA/FLORIDA/ORLANDO service area:
    Object Type #1 = ACME::VIDEOMAIL
        Search Parameters:
            Object Type Name = ACME::VIDEOMAIL
            Object Type Version = 1
            Replication Control = NORMAL
        Object Resource Assignments:
            Object Storage Information:
                Server = OrlServ20; Database = VMail
            Available Object Brokers = Any
            Location Object Storage Information:
                Server = OrlLRServ6; Database = LocRep21
        Default Attribute Values:
            Creation Attributes:
                Compression_Type = MPEG
                Resolution = 300 dpi
            Activation Attributes:
                Zoom_Ratio = 150%
                Frames_Per_Second = 32
        Operating System Implementation Defaults:
            Operating System #1 = MS-Windows_NT
                Default Implementation = PowerView
            Operating System #2 = MS-Windows 4.0
                Default Implementation = ViewMaster
            Operating System #3 = Solaris_2.3
                Default Implementation = Powerview
```

The user profile repositories that serve George and John are configured as shown in TABLE 8. As TABLE 8 shows, only George's user profile repository was assigned an ACME::VIDEOMAIL object type entry when the system was first configured.

TABLE 8

User Profile Repositories

```
/USA/WASHINGTON/SEATTLE service area:
    User #1 = JOHNDOE2
        User Top Container: Empty
        User System Resource Assignments:
            Home Implementation Repository:
                Server = SeaServ2; Database = ImpRep
            Home Service Repository
                Server = SeaServ2; Database = SrvRep
            Home User Repository
                Server = SeaServ2; Database = UserRep
        Object Type Entries: None
        User Demographics
            User Name
            Password
/USA/FLORIDA/ORLANDO service area:
    User #1 = GEORGES1
```

TABLE 8-continued

User Profile Repositories

```
User Top Container:
    Object #1 = ACME::VIDEOMAIL
User System Resource Assignments:
    Home Implementation Repository:
        Server = OrlServ2; Database = ImpRep
    Home Service Repository
        Server = OrlServ2; Database = SrvRep
    Home User Repository
        Server = OrlServ2; Database = UserRep
Object Type Entries:
    Object Type #1 = ACME::VIDEOMAIL
        User Object Resource Assignments:
            Object Storage Information:
                OrlServ50; VidMail3
            Available Object Brokers = Any
            Location Entry Storage Information
                OrlLRServ2; LRep3
        Default Attribute Values:
            Activation Attributes:
                Zoom_Ratio = 100%
                Frames_Per_Second = 32
            Operating System Implementation Pref.:
                Operating System #1 = MS-Windows_NT
                Default = PowerView
        Object Destination Container
            Object Type = SYSTEM::CONTAINER
            Location Repository:
                Server = OrlLRServ2
                Database = Lrep3
                Database Entry = 145
User Demographics
    User Name
    Password
```

The executable and library information that implements the ACME::VIDEOMAIL object operations must be installed before these object operations can be performed. TABLE 9 shows the different implementation choices installed in the implementation repositories. As discussed earlier in conjunction with Table 7, since the Replication Control is set to NORMAL, these entries must been replicated to these repositories at some prior point in time.

TABLE 9

Implementation Repositories

```
/USA/FLORIDA/ORLANDO service area:
    Module #1 = ACME
        Object Type #1
            Search Parameters:
                Operating System = MS-Windows_NT
                Implementation Preference = PowerView
                Network Protocol = ATM
                Hardware Platform = PowerPc
                Object Type Name = ACME::VIDEOMAIL
                Object Type Version = 1
                Replication Control = NORMAL
            Executable Information:
                Executable Name = NT_VMAIL
                Executable Path = C:\SRC\NT\VMAIL
                Executable Storage Location = 573
                Executable Storage Type = File System
                Library Path = C:\LIB\NT\VMAIL
                Run-time Library #1:
                    Library Name = NT_VMAIL.LIB
                    Library Storage Location = 9124
                    Library Storage Type = File System
        Object Type #2
            Search Parameters:
                Operating System = MS-Windows_4.0
                Implementation Preference = ViewMaster
                Network Protocol = WinSock
```

TABLE 9-continued

Implementation Repositories

```
                Hardware Platform = Intel 486 Based
                Object Type Name = ACME::VIDEOMAIL
                Object Type Version = 1
                Replication Control = NORMAL
            Executable Information:
                Executable Name = VMAIL
                Executable Path = C:\SRC\WIN\VMAIL
                Executable Storage Location = 4123
                Executable Storage Type = File System
                Library Path = C:\LIB\WIN\VMAIL
                Run-time Library #1:
                    Library Name = VMAIL.LIB
                    Library Storage Location = 67
                    Library Storage Type = File System
/USA/WASHINGTON/SEATTLE service area:
    Module #1 = ACME
        Object Type #1
            Search Parameters:
                Operating System = Solaris_2.3
                Implementation Preference = PowerView
                Network Protocol = ATM
                Hardware Platform = Sun Sparc
                Object Type Name = ACME::VIDEOMAIL
                Object Type Version = 1
                Replication Control = NORMAL
            Executable Information:
                Executable Name = SUN_VMAIL
                Executable Path = C:\SRC\SUN\VMAIL
                Executable Storage Location = 345
                Executable Storage Type = File System
                Library Path = C:\LIB\SUN\VMAIL
                Run-time Library #1:
                    Library Name = SUN_VMAIL.LIB
                    Library Storage Location = 234
                    Library Storage Type = File System
```

In Procedure

George accesses the system by a procedure commonly referred to as "logging in" to the system or "log-in" for short. Two main operations are performed at log-in. The first is a security function where the system verifies that the user logging in is authorized to use the system. The second major operation performed at log-in involves setting up the user's home environment. This second operation typically involves initializing variables used by the system when the user enters the system and displaying a person's home environment on his or her computer. Typical examples include displaying icons that represent the computer programs that the user can access and executing computer programs that the user always wants executed when the user logs in.

To facilitate these log-in procedures, certain information must be stored in the system before the user logs in and the system must be able to access this information during the log-in process. A typical embodiment of the invention uses the user profile repository to store this information. For example, user demographics, such as the user's name and security information and the User Top Container, which contains information about the objects the user can access, are stored in the user profile.

Figure 12A:
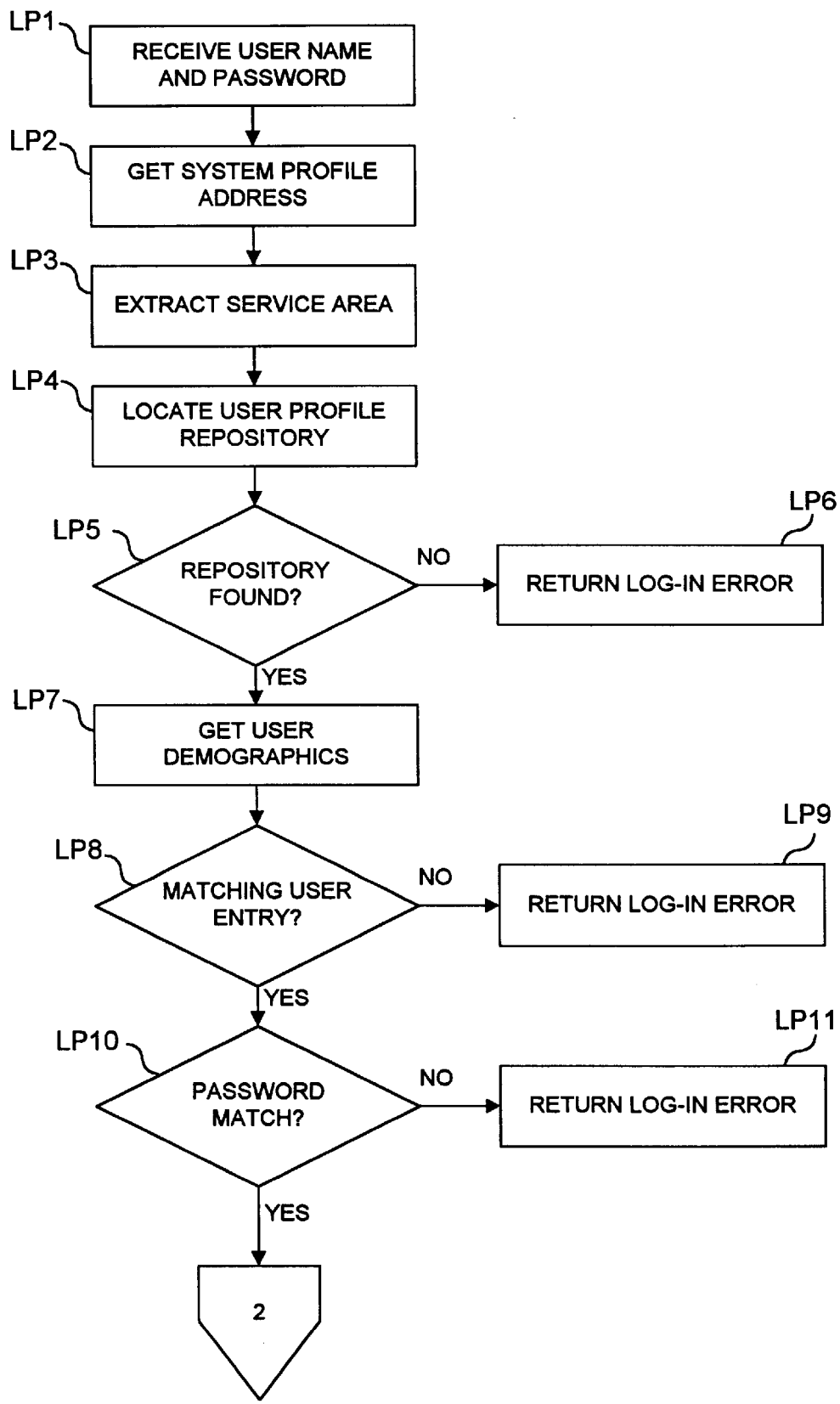
FIGS. 12A and 12B together constitute a flowchart illustrating a sequence of steps performed in accessing the computer environment in accordance with the teachings of the invention.
Figure 12B:
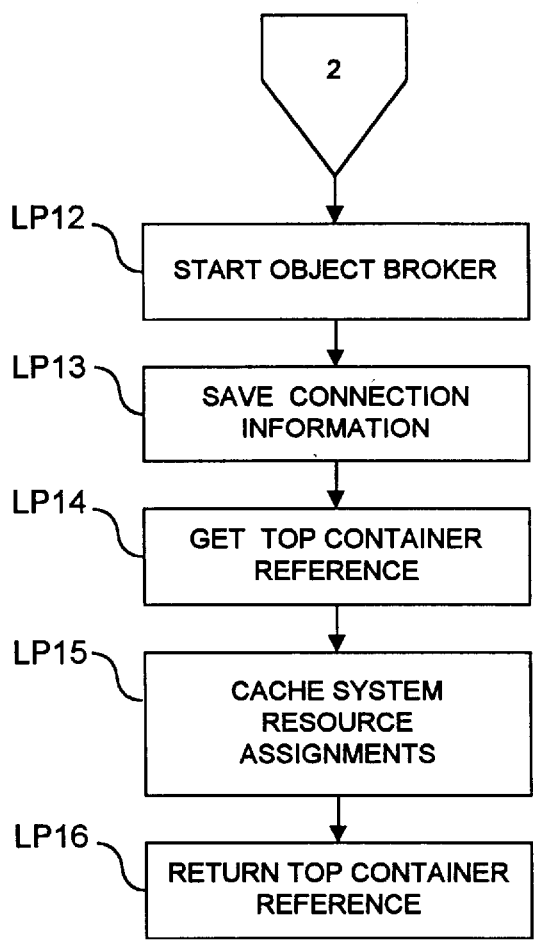

Referring now to FIGS. 12A and 12B, hereinafter referred to collectively as FIG. 12, which depict a typical log-in procedure ("LP"). As represented by a Block LP1, a log-in application running on the user's computer receives the user's name and password when the user logs in.

As represented by a Block LP2, the log-in application retrieves the address of the system profile repository. A system profile repository is located at each service area in the hierarchy and contains information used to access the repositories in the hierarchy. In this example, George logged on to the system at his main computer. Therefore, the local system profile repository is in the /USA/FLORIDA/ORLANDO service area depicted in TABLE 6.

As represented by a Block LP3, the log-in application extracts the local service area which is stored as an environmental variable that would typically be set up by a system administrator using the administration tools. In this example, the local service area is /USA/FLORIDA/ORLANDO.

As represented by a Block LP4, the log-in application passes the local service area and user profile repository type parameters to the Locate Repository routine represented by FIG. 9 in order to locate the user profile repository for this service area. In this example, the Locate Repository routine locates the local service area in the local system profile repository at Entry Name #1, as shown in TABLE 6. The Locate Repository routine then returns the address "OrlServ2 UserRep" contained within the User Repository Configuration. Here, "OrlServ2" is the address of the server used to access the repository database and "UserRep" i s the address of the database.

If the address of the user profile repository had not have been found, a log-in error would have been returned to the user as represented by a Block LP5 and a Block LP6. If the address of the user profile repository was found, the log-in application retrieves the User Demographics shown in TABLE 8 from the user profile repository at a Block LP7, checks for a matching user entry (Block LP8) and a password (Block LP10). If there is no user entry or if the password entered does not match the user's password, a log-in error is returned to the user as indicated at a Block LP9 and a Block LP10.

If the user is authorized to access the system, the log-in application sets up the user's home environment. As represented by a Block LP12, the log-in application first starts an object broker 22 for the user. Next, as represented by a Block LP13, the log-in application saves the information that the client application will need to access the object broker just started. As represented by a Block LP14, the log-in application retrieves the User Top Container reference from the user profile repository in order to get the references of the objects the user can access.

Next, as represented by a Block LP15, the log-in application caches the user's system resource assignments located in the user profile repository. As shown in TABLE 8, George's system resource assignments contain the addresses of his Home User Profile, Home Service Profile and Home Implementation Repositories.

Finally, as represented by a Block LP16, the login application returns the object reference of the User Top Container.

After receiving the object reference of the User Top Container, the log-in application requests an open operation on the User Top Container in order to display the contents of the container. Once the User Top Container is opened, the User Top Container implementation displays its contents on George's computer. Referring to TABLE 8, George's User Top Container only contains the ACME::VIDEOMAIL object. George selects the ACME::VIDEOMAIL object in order to create and send the video mail message to John.

In order to activate the ACME::VIDEOMAIL operation that George has requested, the system must first create an instance of the ACME::VIDEOMAIL object. After this instance of the object is created, George performs an open operation on the newly created object which causes the ACME::VIDEOMAIL implementation to perform the functions necessary for George to record his video mail message. After George finishes recording the message, he selects the send operation which causes the message to be sent to John. These procedures will be discussed in detail.

Creating the Video Mail Message

When George selects the ACME::VIDEOMAIL object from his User Top Container, a program running on George's computer sends an object creation request message to George's object broker. Referring now to the Object Creation routine represented by FIG. 5, the object broker 22 retrieves creation parameters from George's user profile repository and service profile repository using the Repository Search routine represented by FIG. 8. The addresses of George's user and service profile repositories were cached when George logged in to the system. Therefore, the Locate Repository routine will not be invoked by the Repository Search routine. In addition, no replication of George's service profile repository is needed because, as shown by TABLE 7, the /USA/FLORIDA/ORLANDO service profile repository contains an ACME::VIDEOMAIL object entry.

As shown in TABLE 8, George's user profile repository contains Creation Parameters defined by the ACME::VIDEOMAIL object's Object Resource Assignments. Therefore, these parameters will be passed to the creation operation instead of the parameters defined in George's service profile repository shown in TABLE 7. For example, the "OrlServ50 VidMail3" not the "OrlServ20 VMail" Object Storage information will be used to determine where the object is stored. However, the Compression_Type and Resolution Creation Attributes defined in George's service profile repository are not defined in George's user profile repository. Consequently, these two attributes will be passed to the creation operation.

Referring again to the Object Creation operation represented by FIG. 5, the object broker 22 retrieves the Available Object Broker information from George's user and service profile repository. As TABLES 7 and 8 show, there are no object brokers entries and, consequently, there are no object broker restrictions.

Next, the object broker 22 checks whether the ACME::VIDEOMAIL implementation is activated. Since George has not activated this object before now, the object will have to be activated. The object broker 22 queries George's user and service profile repositories for implementation defaults and preferences. As shown in TABLES 7 and 8, George's service profile repository does not contain any implementation information that the user profile repository does not supply. Therefore, only the entries in George's user profile repository will be used to supply the implementation preference information.

To retrieve the location information for the executable and library implementation information, the object broker 22 queries the implementation repository using the address that was cached when George logged in. TABLE 8 shows that George's Home implementation repository is located at "OrlServ2 ImpRep." As the /USA/FLORIDA/ORLANDO entry in TABLE 6 shows, this is the address of the Peer Replication Implementation Repository in the /USA/FLORIDA/ORLANDO service area. The Search Parameters are based on George's computing environment and the Implementation Preferences retrieved from his user profile repository above. As shown in TABLE 9, these parameters match Object #1 in George's implementation repository.

At this point in the object creation process, all the information has been retrieved from the information repositories and the next step is to activate the implementation. If the object creation implementation specified by the Executable Information in TABLE 9 is not already loaded onto the compute device, the object broker 22 loads the implementation from the areas indicated by the Executable Information. The implementation is started and the create operation and the cached creation parameters are passed to the implementation.

After the create operation is passed to the implementation, the object is created. Here, the implementation requests an entry in the "OrlServ50 VidMail3" database specified in the Object Storage Information in George's user profile repository. Then, the implementation stores the object's attributes in the database entry returned by the database. Next, the implementation requests an object reference from the object broker. The object broker 22 sets up an entry for the newly created object in the "OrlLRServ2 Lrep3" location repository specified by the Location Object Storage Information in George's user profile repository. The Data Storage Location of this entry will be the database entry returned by the "OrlServ50 VidMail3" database above. The object broker 22 then builds an object reference for the newly created object. This object reference will contain the ACME::VIDEOMAIL object type and the location repository entry information from above. Finally, the implementation initializes the ACME::VIDEOMAIL Object's algorithm using the Creation Attributes and the Activation Attributes retrieved earlier from George's user and service profile repositories.

An open operation is then performed on the newly created object. After which, the implementation presents the appropriate interface to George which allows him to record the video mail message.

Sending the Video Mail Message

After George finishes recording the message, he sends the message to John by selecting the send operation and keying in John's user identification. In order to deliver the message to John, the object broker 22 will attempt to locate the Destination Container for John's incoming ACME::VIDEOMAIL objects. This parameter should be located in John's user profile repository under the ACME::VIDEOMAIL object type entry.

The send operation will invoke the Repository Search routine to locate John's user profile repository. Since John's user profile repository address has not been cached, the Repository Search routine will invoke the Locate Repository routine.

The search for John's user profile repository starts with George's system profile repository in the /USA/FLORIDA/ORLANDO service area. As shown in TABLE 6, this repository only contains an entry for its own service area. Therefore, the search request will be passed up to this service area's Parent System Profile Repository. As shown in TABLE 6, the address of the this service area's Parent System Profile Repository, /USA/FLORIDA, is "FLServ2 SysProf."

As TABLE 6 shows, the /USA/FLORIDA system profile repository does not contain an entry for John's service area. As a result, the Locate Repository routine will search for entries that are above John's service area in the hierarchy. Here, a match will be found with the /USA/WASHINGTON service area. The search will be passed to that service area's system profile repository located at "WAServ1 SysProf."

The search at the /USA/WASHINGTON service area will find the Child Level Name entry for Seattle under Entry Name #1. The address of the Seattle Child System Profile Repository, as shown in TABLE 6, is "SeaServ1 SysProf." The search will be passed to the /USA/WASHINGTON/SEATTLE system profile repository.

The search at the /USA/WASHINGTON/SEATTLE service area will find the Peer Replication Repository at address "SeaServ2 UserRep" in the User Repository Configuration information under Entry Name #1, as shown in TABLE 6. This search result will be passed back to the send operation through the search routines that were called at the /USA/WASHINGTON/SEATTLE, /USA/WASHINGTON, and /USA/FLORIDA service areas.

As TABLE 8 shows, John's user profile repository does not contain an entry for the ACME::VIDEOMAIL object. Consequently, John does not have Destination Container for this object type. Therefore, the send routine will query John's user profile repository for the address of his User Top Container, shown in TABLE 8, in order to send the object to the User Top Container.

The send operation delivers the ACME::VIDEOMAIL object to John's User Top Container by executing a copy operation that creates an new ACME::VIDEOMAIL object. This create operation is performed essentially as described above except that, here, John's service profile repository which is in the /USA/WASHINGTON/SEATTLE service area is queried for Creation Parameters instead of George's service profile repository.

The Repository Search routine, as represented by FIG. 8, is used to get these Creation Parameters. Since the Replicate_Flag parameter is set to TRUE, the Replication On-Demand routine, as represented in FIG. 11, will query John's service profile repository for the Creation Parameters. However, as TABLE 7 shows, John's service profile repository, does not contain an ACME::VIDEOMAIL entry. Therefore, the Replication On-Demand routine will invoke the Locate Repository routine, described by FIG. 9, to get the address of the service profile repository at the /USA/WASHINGTON service area in order to pass the search to that repository.

As TABLE 7 shows, the /USA/WASHINGTON service area does contain the ACME::VIDEOMAIL object. Therefore, the Replication On-Demand routine will pass back the Creation Parameters found here and will replicate the ACME::VIDEOMAIL object to the /USA/WASHINGTON/SEATTLE service profile repository.

The /USA/WASHINGTON Creation Parameters specify that the object will be stored in the "WAServ20 VmailAA" database and the location repository will be the "WALRServ6 LocRep21" database. Therefore, the send operation will request a storage entry for the newly created object in the "WAServ20 VmailAA" database. In addition, that database entry will be stored in the location repository named "WALRServ6 LocRep21".

The send operation then gets an object reference for the newly created object from the object broker 22 and adds the reference to John's User Top Container. George then closes the ACME::VIDEOMAIL object which causes its implementation to end and causes the object broker 22 to delete that object's cached information.

Viewing the Video Mail Message

John views the video mail message by requesting an open operation on the ACME::VIDEOMAIL object. This operation will follow the same procedures described above except that John uses a different computer environment that George does. John's configuration uses the Solaris_2.3 Operating System, a Sun Sparc Hardware Platform, ATM Network Protocol, and a PowerView Implementation Preference. As shown in TABLE 9, this configuration matches the implementation repository Search Parameters in the /USA/WASHINGTON/SEATTLE service area. Consequently, the Executable Information from that implementation repository entry will be used instead of the Executable Information that was used to invoke George's ACME:VIDEOMAIL operations. After viewing the message, if John deletes the message the ACME:VIDEOMAIL object's delete operation will be performed which will delete this instance of the ACME:VIDEOMAIL object.

The example above illustrates the advantages provided by the present invention in managing a collection of objects. By storing object creation and activation attributes in repositories that are accessed when the object is created and activated, the objects managed by the system can be implemented on any given hardware platform, operating system, or other system resource in a manner that is transparent to the user of the object. Since the information that provides this flexibility is stored in a repository, the information can be changed whenever needed to alter an individual user's computing environment, to shift system resource loads to other parts of a distributed system, or to add new processing capabilities.

In addition, the present invention provides unique solutions to the growth problems that arise in distributed computing environments. Through the use of location repositories and a hierarchy of repositories, system storage can be changed as needed in a manner that is transparent to the users of the object s that use the system storage resources.

These advantages are provided in system that inherently provides a simple and efficient method of managing system objects and the system's compute, network, and storage resources, all of which can be accomplished with minimal impact on the system's users.

While certain specific embodiments of the invention are disclosed as typical, the invention is not limited to these particular forms, but rather is applicable broadly to all such variations as fall within the scope of the appended claims. For example, the information stored in the disclosed repositories and the system resources managed need not be limited to those described. Similarly, the information in the repositories may be stored and retrieved in a variety of different ways and the types of repositories used can vary depending on the functionality required in a given system. In addition, objects can be created and deleted, object operations can be performed, repositories can be located, or information in the repositories can be replicated in a number of different ways without deviating from the teachings of the invention. Thus, the specific steps discussed in detail above concerning the performance of these operations are merely illustrative of one embodiment of the invention.

What is claimed is:

1. A method of managing an object-oriented computer environment for use by a plurality of users comprising the steps of:

providing a plurality of objects stored in object implementation repositories for performing object operations, each of said objects having a life cycle including object creation, object activation and object deletion;

providing a plurality of object brokers to manage said objects in performance of said object operations;

storing, in a plurality of location repositories separate from said object implementation repositories, location information identifying the storage locations of respective ones of said object implementation repositories;

causing the object brokers to access the information in at least one of said repositories during the life cycles of one or more of said objects; and using the information within the repositories during the life cycles of said objects to manage the use of system resources by said objects.

2. The method of claim 1 which further comprises:

accessing the object by retrieving said location information from one of the repositories and thereafter using the retrieved information to locate the object; and changing said location information in response to a change in said storage location for an object.

3. The method of claim 3 wherein:

said location information is changed in the course of object operations.

4. The method of claim 2 wherein:

new objects are created, as needed, and said location information is changed to assign locations within the environment at which said new objects are stored.

5. A method of managing an object-oriented computer environment for use by a plurality of users comprising the steps of:

providing a plurality of objects stored in object implementation repositories for performing object operations, each of said objects having a life cycle including object creation, object activation and object deletion;

providing a plurality of object brokers to manage said objects in the performance of said object operations;

storing, in a plurality of profile repositories separate from said object implementation repositories, information indicating preferences for a preselected manner of performing said object operations;

causing the object brokers to access the information in at least one of said repositories during the life cycles of one or more of said objects; and using the information within the repositories during the life cycles of said objects to manage the use of system resources by said objects.

6. The method of claim 5 which further comprises:

initiating object operations by retrieving said preference information from one of the profile repositories and thereafter using said preference information in the performance of said operations.

7. The method of claim 6 wherein:

said preference information is changed in the course of object operations.

8. The method of claim 5 wherein:

the information within at least one of said profile repositories includes information as to preferences of at least one user for a preselected manner of performing object operations, said preference including system resource information; and said profile repository provides said user preference information in response to user identification.

9. The method of claim 8 wherein:

said user identification messages include information as to a type of object to be implemented and a type of operating system to be used.

10. The method of claim 5 wherein:

at least one of said profile repositories contains search information and information specifying default preferences for a preselected manner of performing object operations within a preselected service category; and said at least one profile repository provides said default preferences in response to messages including search criteria and identifying said service category.

11. The method of claim 10 wherein:

said identifying messages further identify a type of object to be implemented and a type of operating system to be used.

12. The method of claim 5 wherein:

at least one of said profile repositories contains search information and information specifying default preferences for a preselected manner of performing object operations within a preselected geographic service category; and said at least one profile repository provides said default system preferences in response to messages including search criteria and identifying said geographic service category.

13. The method of claim 5 wherein:

the contents of said at least one profile repository further specifies restrictions on which of the object brokers can be used to manage a particular object in the performance of object operations.

14. A method of managing an object-oriented computer environment for use by a plurality of users comprising the steps of:

providing a plurality of objects stored in object implementation repositories for performing object operations, each of said objects having a life cycle for performing object operations, each of said objects having a life cycle;

providing a plurality of object brokers to manage said objects in the performance of said object operations;

storing, in a plurality of system profile repositories, separate from said object implementation repositories, information to perform object operations;

assigning said implementation repositories to different levels of a hierarchy, said levels including at least a parent level, a peer level and a child level;

accessing information in at least one of said implementation repositories to activate one or more of said objects; and the information stored in said system profile repositories including access information required to access the contents of said implementation repositories, said access information including information for at least one of said parent level, said peer level or said child level of said hierarchy.

15. The method of claim 14 wherein:

the system profile repositories are themselves assigned to different levels of said hierarchy and said access information includes information required to access other system profile repositories.

16. The method of claim 14 wherein:

the repositories at different levels of said hierarchy pass queries to each other to locate requested information.

17. The method of claim 14 wherein:

the repositories perform operations to replicate said information within and between said levels of said hierarchy, as required to make the information accessible throughout the computer environment.

18. The method of claim 17 wherein:

a preselected one of the repositories at each level of the hierarchy replicates changes in said information to the other repositories at the same level.

19. The method of claim 17 wherein:

at least one of the repositories at each level of the hierarchy replicates changes in said information to the repositories at the next lower level.

20. The method of claim 14 wherein:

one of said repositories passes a query to another of said repositories at a different level of the hierarchy when said one repository does not contain information requested by a computing entity of said environment.

21. The method of claim 20 wherein:

said other of said repositories is located above said one of said repositories in the hierarchy.

22. The method of claim 20 wherein:

said other of said repositories queries an additional repository at another level of said hierarchy if said other repository does not contain the requested information.

23. The method of claim 22 wherein:

the repository at which the requested information is ultimately found communicates the requested information or its address to said one of said repositories; and said one of said repositories, in turn, communicates the requested information or its address to the computing entity requesting it.

24. The method of claim 23 wherein:

said one of said repositories replicates the requested information for storage therein.

25. An object-oriented computer environment for use by a plurality of users comprising:

a plurality of objects stored in object implementation repositories for performing object operations, each of said objects having a life cycle including object creation, object activation and object deletion;

a plurality of object brokers capable of managing said objects in the performance of said object operations; and a plurality of location repositories separate from said object implementation repositories which contain location information indicating the storage locations within the environment of respective ones of said object implementation repositories, the information within said repositories being useable during the life cycles of said objects to manage the use of system resources by said objects.

26. The object-oriented computer environment of claim 25 wherein:

said location information is changed in response to a change in said location at which said object is stored.

27. The object-oriented computer environment of claim 26 wherein:

said location information is changeable in the course of object operations.

28. The object-oriented computer environment of claim 26 wherein:

said location information is changeable to assign a location within the environment at which a new object is stored when it is created.

29. An object-oriented computer environment for use by a plurality of users comprising:

a plurality of objects stored in object implementation repositories for performing object operations, each of said objects having a life cycle including object creation, object activation and object deletion;

a plurality of object brokers capable of managing said objects in the performance of said object operations; and a plurality of profile repositories separate from said object implementation repositories which contain location information indicating the preferences for a preselected manner of performing object operations, the information within said repositories being useable during the life cycles of said objects to manage the use of system resources by said objects.

30. The object-oriented computer environment of claim 29 wherein:

said preferences are stored after an object type associated with said object operations is installed in said computer environment.

31. The object-oriented computer environment of claim 30 wherein:

said preference information is changeable in the course of object operations.

32. The object-oriented computer environment of claim 29 wherein:

the information within at least one of said profile repositories includes information as to preferences of at least one user for a preselected manner of performing said object operations, said preferences including system resource information, said user preference information being provided by said repository in response to user identification messages.

33. The object-oriented computer environment of claim 32 wherein:

said user identification messages include information as to a type of object to be implemented and a type of operating system to be used.

34. The object-oriented environment of claim 29 wherein:

at least one of said profile repositories contains search information and information specifying default preferences for a preselected manner of performing object operations within a preselected service category, said default preferences being provided in response to messages including search criteria and identifying said service category.

35. The object-oriented computer environment of claim 34 wherein:

said identifying messages further identify a type of object to be implemented and a type of operating system to be used.

36. The object-oriented computer environment of claim 29 wherein:

at least one of said profile repositories contains search information and information specifying default preferences for a preselected manner of performing object operations within a preselected geographic service category, said default characteristics being provided in response to messages including search criteria and identifying said geographic service category.

37. The object-oriented computer environment of claim 29 wherein:

the contents of said at least one profile repository further specifies restrictions on which of the object brokers can be used to manage a particular object.

38. An object-oriented computer environment for use by a plurality of users comprising:

a plurality of objects stored in object implementation repositories for performing object operations, each of said objects having a life cycle, said implementation repositories being assigned to different levels of a hierarchy including at least a parent level, a peer level and a child level;

a plurality of object brokers capable of managing said objects in the performance of said object operations; and a plurality of system profile repositories repositories separate from said object implementation repositories which themselves are processing entities that process queries for information, said system profile repositories containing access information required to access the information in said implementation repositories, said access information including information for at least one of a parent level, a peer level and a child level.

39. The object-oriented computer environment of claim 38 wherein:

the system profile repositories are themselves assigned to different levels of said hierarchy and said access information includes information required to access other system profile repositories.

40. The object-oriented computer environment of claim 38 wherein:

the repositories at different levels of said hierarchy pass queries to each other to locate requested information.

41. The object-oriented computer environment of claim 38 wherein:

the repositories are capable of replicating information within and between said levels of said hierarchy, as required to make the information accessible throughout the computer environment.

42. The object-oriented computer environment of claim 41 wherein:

a preselected one of the repositories at each level of the hierarchy is capable of replicating changes in said information to the other repositories at the same level.

43. The object-oriented computer environment of claim 41 wherein:

at least one of the repositories at each level of the hierarchy is capable of replicating changes in said information to the repositories at the next lower level.

44. The object-oriented computer environment of claim 38 wherein:

one of said repositories is capable of querying another of said repositories at a different level of said hierarchy when said one repository does not contain information requested by a computing entity of said environment.

45. The object-oriented computer environment of claim 44 wherein:

said other of said repositories is located above said one of said repositories in the hierarchy.

46. The object-oriented computer environment of claim 44 wherein:

said other of said repositories is capable of querying an additional repository at another level of said hierarchy if said other repository does not contain the requested information.

47. The object-oriented computer environment of claim 46 wherein:

the repository at which the requested information is ultimately found is capable of communicating the requested information or its address to said one of said repositories; and said one of said repositories, in turn, communicates the requested information or its address to the computing entity requesting it.

48. The object-oriented computer environment of claim 47 wherein:

said one of said repositories is capable of replicating the requested information for storage therein.

* * * * *